(12) United States Patent
Kamakura

(10) Patent No.: US 10,203,497 B2
(45) Date of Patent: Feb. 12, 2019

(54) HEAD MOUNTED IMAGE DISPLAY APPARATUS

(71) Applicant: SEIKO EPSON CORPORATION, Tokyo (JP)

(72) Inventor: Kazuya Kamakura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 48 days.

(21) Appl. No.: 15/419,131

(22) Filed: Jan. 30, 2017

(65) Prior Publication Data

US 2017/0235129 A1    Aug. 17, 2017

(30) Foreign Application Priority Data

Feb. 15, 2016 (JP) ................................. 2016-026432

(51) Int. Cl.
G02B 27/00 (2006.01)
G02B 27/01 (2006.01)

(52) U.S. Cl.
CPC ..... *G02B 27/0006* (2013.01); *G02B 27/0176* (2013.01); *G02B 2027/0178* (2013.01)

(58) Field of Classification Search
CPC ............... G02B 27/0006; G02B 27/01; G02B 27/0149; G02B 27/0176; G02B 27/0172
See application file for complete search history.

(56) References Cited

U.S. PATENT DOCUMENTS

| 8,867,137 B2* | 10/2014 | Shimada | G02B 27/0149 348/115 |
| 8,994,612 B2* | 3/2015 | Fujishiro | G02B 27/0172 345/8 |
| 9,612,441 B2* | 4/2017 | Lee | G06F 1/163 |
| 2009/0168131 A1 | 7/2009 | Yamaguchi et al. | |
| 2014/0139403 A1* | 5/2014 | Hiraide | G02B 27/0172 345/8 |
| 2014/0139927 A1* | 5/2014 | Hiraide | G02B 27/0176 359/630 |
| 2014/0247500 A1* | 9/2014 | Takeda | G02B 27/0172 359/631 |
| 2015/0177520 A1 | 6/2015 | Hiraide et al. | |

FOREIGN PATENT DOCUMENTS

| JP | 2009-157290 A | 7/2009 |
| JP | 2015-121740 A | 7/2015 |

* cited by examiner

*Primary Examiner* — Sardis F Azongha
(74) *Attorney, Agent, or Firm* — Oliff PLC

(57) ABSTRACT

A head mounted image display apparatus including an image projection section that forms an image and projects the image, a display section that displays the image projected by the image projection section, a control section that controls the image formation performed by the image projection section, a frame member that supports the display section, and a case member that is attached to the frame member and accommodates the image projection section and the control section, wherein the control section is located below the image projection section, and the case member includes an inner case that has a first rib surrounding the circumference of the control section and is located between the image projection section and the control section and an outer case that is attached to the frame member and covers the image projection section and the control section and further covers the inner case.

11 Claims, 24 Drawing Sheets

HEAD MOUNTED IMAGE DISPLAY APPARATUS

BACKGROUND

1. Technical Field

The present invention relates to a head mounted image display apparatus.

2. Related Art

There is a known head mounted image display apparatus or what is called a head mounted display (HMD) of related art that is mounted on a user's head and displays an image visually recognizable by the user. As a head mounted display of this type, there is a known virtual image display apparatus having a dustproof structure (see JP-A-2015-121740, for example).

The virtual image display apparatus described in JP-A-2015-121740 includes a first display apparatus that forms a virtual image for the right eye, a second display apparatus that forms a virtual image for the left eye, and a frame section that supports these display apparatus. Among the components described above, each of the display apparatus includes an image formation main body section including a video display element, and a projection lens accommodated in a lens barrel and a light guide device that guides projected video light (virtual image forming light) to a user's (viewer's) eyes. A front end portion that is part of the light guide device and located on the light source side is so fit into an end portion of the lens barrel as to be fixed and positioned relative to the projection lens with precision. Further, a dustproof structure in the form of a seal member is provided between a light guide member of the light guide device and the lens barrel, which covers the projection lens. The thus provided dustproof structure prevents entry of dust into the lens barrel in an irremovable manner.

In recent years, applications of a head mounted display are expanding, and not only is indoor use of a head mounted display conceivable but also outdoor use is conceivable, resulting in possible entry of rain, sweat, and other types of liquid into the head mounted display.

To prevent the possible entry, it is conceivable to fill a gap between components of the head mounted display, for example, with an adhesive and add a waterproof member. Such a configuration, however, undesirably complicates assembly work.

SUMMARY

An advantage of some aspects of the invention is to provide a head mounted image display apparatus that can be waterproofed without complication of assembly work.

A head mounted image display apparatus according to an aspect of the invention includes an image projection section that forms an image and projects the image, a display section that displays the image projected by the image projection section, a control section that controls the image formation performed by the image projection section, a frame member that supports the display section, and a case member that is attached to the frame member and accommodates the image projection section and the control section. The control section is located below the image projection section, and the case member includes an inner case that has a first rib surrounding a circumference of the control section and is located between the image projection section and the control section and an outer case that is attached to the frame member and covers the image projection section and the control section and further covers the inner case.

According to the aspect described above, out of the image projection section and the control section accommodated in the case member attached to a frame, the control section is located below the image projection section. The circumference of the control section is surrounded by the first rib of the inner case, which is located between the image projection section and the control section, and the control section is further covered with the outer case. The outer case, which forms the exterior, can therefore prevent entry of external liquid and adherence of the liquid to the image projection section and the control section. Further, the circumference of the control section is surrounded by the first rib of the inner case. Therefore, even if the liquid enters the case member, adherence of the liquid to the control section can be reliably avoided. Therefore, since a gap that is likely to allow entry of liquid is not required to fill with a filler, such as an adhesive, a waterproof structure of the head mounted image display apparatus can be formed without complication of assembly work of the head mounted image display apparatus.

In the aspect described above, it is preferable that the image projection section includes an image formation section that forms the image, a lens that projects the image formed by the image formation section, and a lens barrel that accommodates the lens.

The image formation section can, for example, be a self-luminous display panel or the combination of a light source and a light modulator, and the light modulator can, for example, be a liquid crystal panel or a device using micromirrors, such as MEMS mirrors.

According to the configuration described above, the image projection section can reliably project an image according to supplied image information to the display section.

In the aspect described above, it is preferable that the frame member has a front section that supports the display section and a side surface section that extends from an end portion of the front section in a direction intersects the front section, that the side surface section has a second rib that extends in an extending direction of the side surface section, that the second rib has a groove formed in an upper surface of the second rib and extending along the extending direction, and that the outer case has a protrusion inserted into the groove.

According to the configuration described above, in the side surface section, the groove is formed in the rib extending along the extending direction described above. The protrusion of the outer case, which is attached to the frame member, is inserted into the groove. According to the configuration described above, in a case where the liquid enters the gap between the side surface section and the outer case, the groove can guide the liquid toward one end and the other end thereof in the extending direction described above. The liquid can therefore be moved away from a component to which the liquid is not desired to adhere (control section, for example). Adherence of the liquid to the component can therefore be avoided, whereby a waterproof structure of the head mounted image display apparatus can be reliably configured.

Further, in a case where the protrusion inserted into the groove is formed on an end portion that forms the outer case and comes into contact with the side surface section, the liquid that travels along the end portion can be readily guided to the groove.

In the aspect described above, it is preferable that the groove is formed from a predetermined position in the side surface section to an end portion that forms the side surface section and is located on a side opposite the front section, and that at least one of the outer case and the side surface section has an opening that exposes the groove on the side opposite the front section.

According to the configuration described above, in the side surface section, the groove is formed in the entire region from the end portion on the side facing the front section to the end portion opposite the front section. The opening that exposes the groove is located at the end portion opposite the front section at least in one of the outer case and the side surface section. As a result, the liquid having entered the groove through the gap between the side surface section and the outer case can be guided along the groove toward the side opposite the front section and discharged out of the apparatus through the opening. Adherence of the liquid to the component described above, such as the control section, can therefore be reliably avoided, whereby a waterproof structure of the head mounted image display apparatus can be reliably configured.

In the aspect described above, it is preferable that the outer case has an upper case that covers the image projection section and the inner case from above and a lower case that covers the inner case and the control section from below, and that the upper case has the protrusion.

According to the configuration described above, the outer case has the upper case and the lower case separate from each other. The outer case having the protrusion to be inserted into the groove described above can therefore be readily attached to the frame member, as compared with a case where an outer case formed of the upper case and the lower case integrated with each other is attached to the frame member (side surface section described above for example).

In the aspect described above, it is preferable that a dimension of the inner case in a width direction roughly perpendicular to the extending direction and further perpendicular to an upward/downward direction is smaller than a dimension of the upper case in the width direction.

According to the configuration described above, the upper case can reliably cover the inner case. The inner case can therefore be reliably protected from liquid, such as rain, coming from above the upper case and impact applied therefrom, and the control section, which is located below the inner case, can be in turn reliably protected.

In the aspect described above, it is preferable that the side surface section has an engaging section that protrudes toward the inner case, and that the inner case has a positioner that engages with the engaging section to position the inner case relative to the side surface section.

According to the configuration described above, the inner case can be positioned relative to the side surface section. The attachment of the outer case, which is so attached as to cover the inner case, can therefore be readily performed.

In the aspect described above, it is preferable that the outer case has an upper case that covers the image projection section and the inner case from above and a lower case that covers the inner case and the control section from below, and that the lower case has a contact surface that comes into contact with a front end surface of the first rib.

According to the configuration described above, the lower case, which covers the inner case and the control section from below, has the contact surface, which comes into contact with the front end surface of the first rib, which is part of the inner case and surrounds the circumference of the control section. As a result, a situation in which a gap that allows entry of liquid is created between the first rib and the lower case and in the space which is formed by the first rib and the lower case and where the control section is disposed can be avoided. Therefore, adherence of the liquid to the control section can be reliably avoided, whereby the control section can be protected.

In the aspect described above, it is preferable that the lower case has a raised section that is raised along a circumferential edge of a facing surface that faces the inner case and an inner stepped section that is located inside the raised section and so formed as to be lower than a front end surface of the raised section but above the facing surface, that the inner stepped section has the contact surface, and that a side surface of the first rib comes into contact with a side surface of the raised section.

According to the configuration described above, the front end surface of the first rib comes into contact with the inner stepped section formed inside the raised section, and the side surface of the first rib comes into contact with the side surface of the raised section. The configuration described above can prevent entry of liquid through the gap between the first rib and the raised section into the space in which the control section, the circumferential edge of which is surrounded by the first rib, which is in contact with the inner stepped section, is disposed. Adherence of the liquid to the control section can therefore be more reliably avoided.

In the aspect described above, it is preferable that the lower case has a raised section that is raised along a circumferential edge of a facing surface that faces the inner case and an outer stepped section that is located outside the raised section and so formed as to be lower than a front end surface of the raised section but above a lower surface of the lower case, and that a lower end edge of the upper case comes into contact with the outer stepped section.

According to the configuration described above, the lower end edge of the upper case comes into contact with the outer stepped section, which is formed outside the raised section of the lower case. The configuration can prevent a gap that allows entry of liquid from being formed between the lower case and the upper case. Entry of liquid into the outer case can therefore be avoided, whereby adherence of the liquid to the components described above, such as the control section, the lower side of which is covered with the outer case, can be reliably avoided.

In the aspect described above, it is preferable that the frame member and the case member have an insertion section through which one end of the display section is inserted, and that a waterproof member that surrounds the one end of the display section and connects the display section to the insertion section is provided in the insertion section.

According to the configuration described above, a situation in which a gap that allows entry of liquid is formed between the inner edge of the insertion section and the display section can be avoided. Adherence of the liquid to the image projection section can therefore be reliably avoided.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention will be described below with reference to the drawings.

Exterior Configuration of HMD

Figure 1:
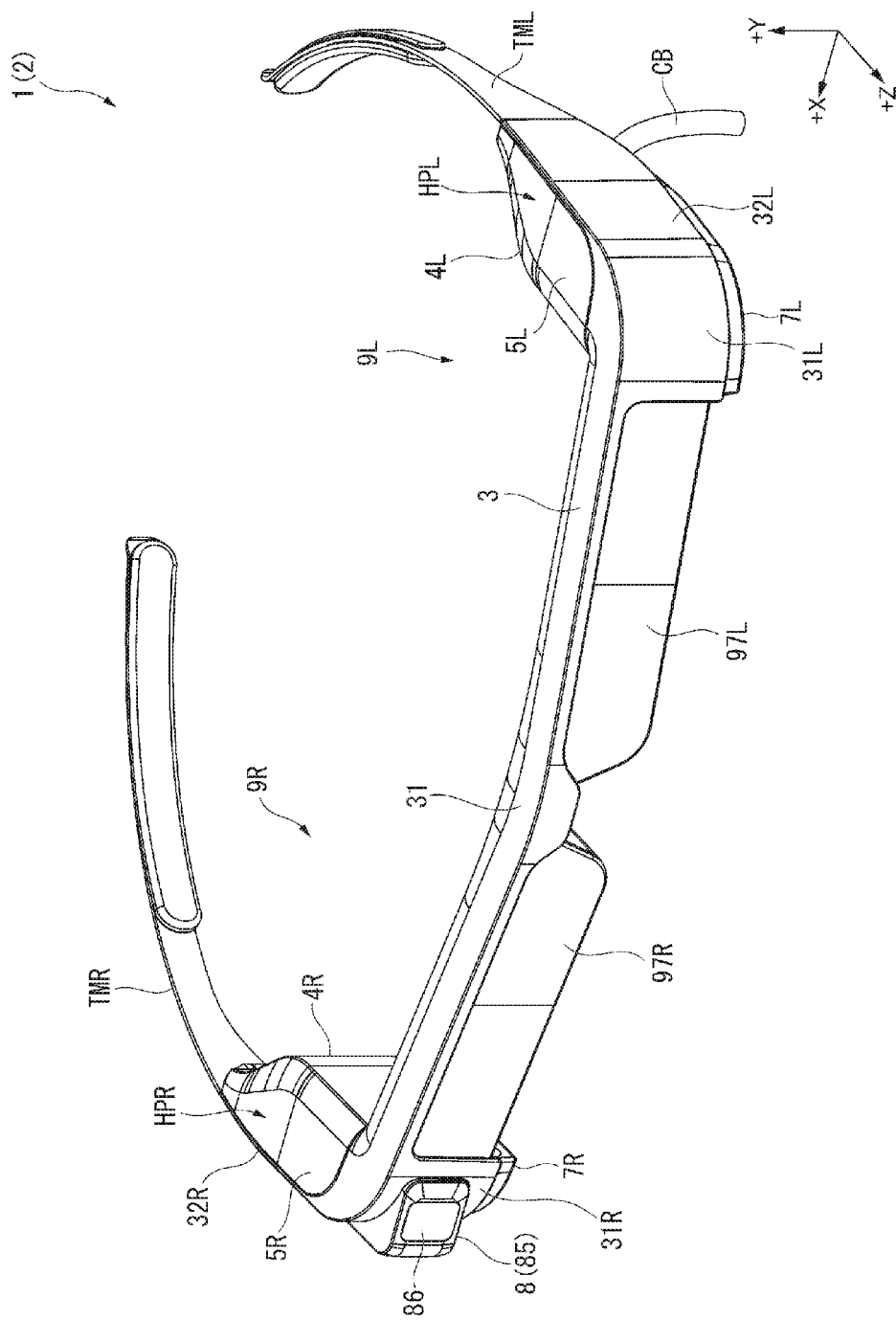
FIG. 1 is a perspective view showing an HMD according to an embodiment of the invention.
Figure 2:
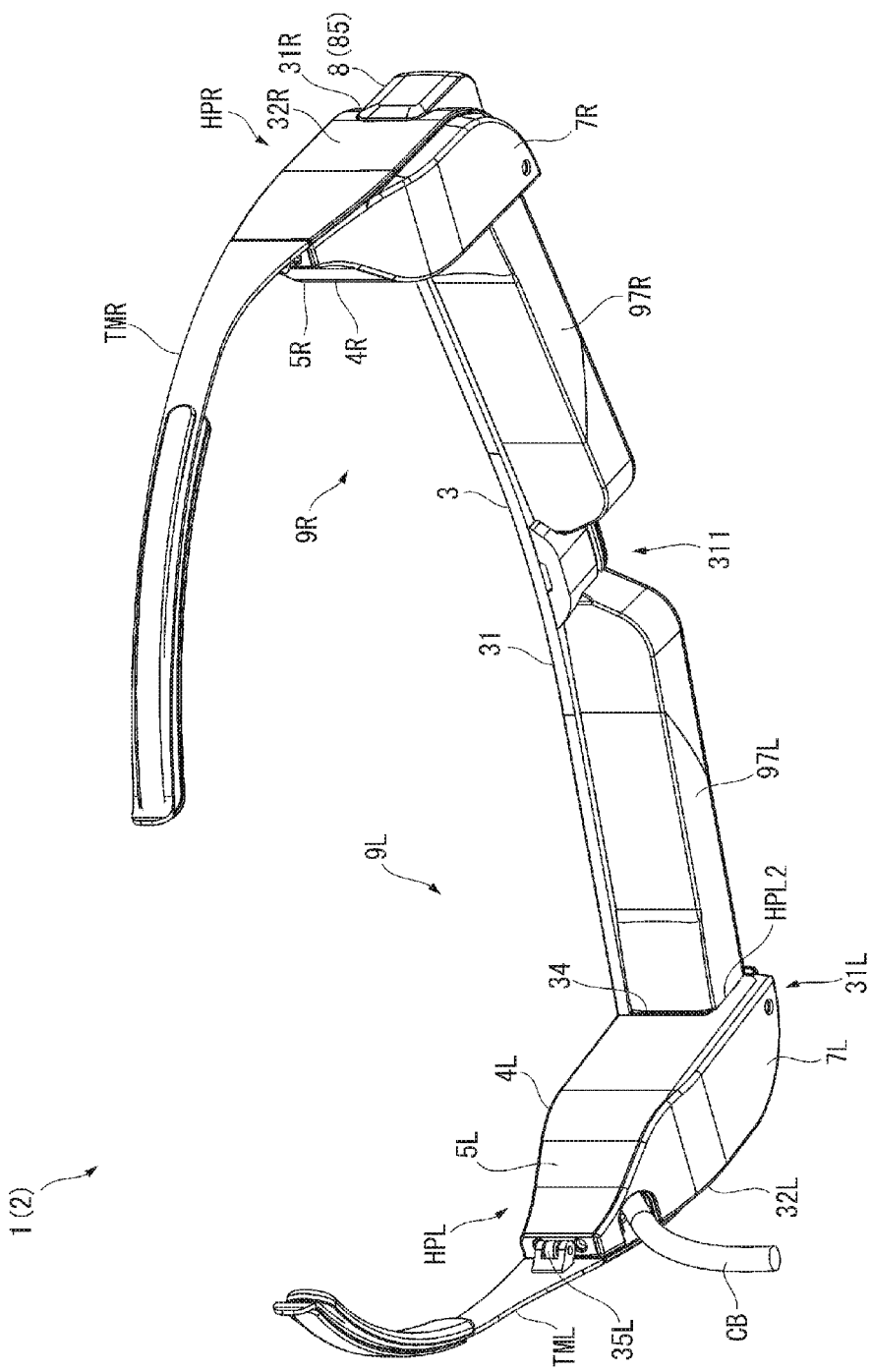
FIG. 2 is a perspective view showing the HMD in the embodiment.
Figure 3:
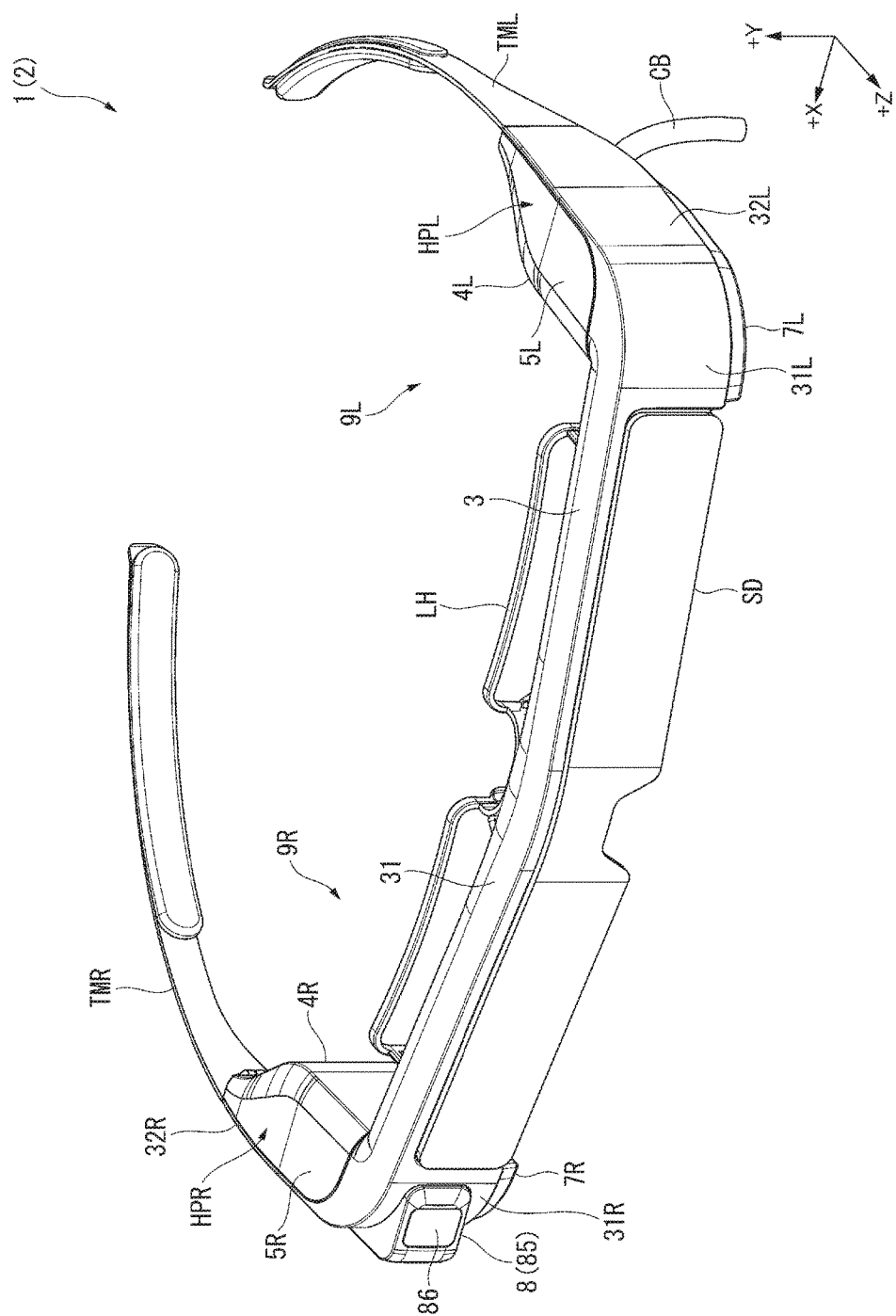
FIG. 3 is a perspective view showing the HMD on which a lens holder and a light shielding member are mounted in the embodiment.
Figure 4:
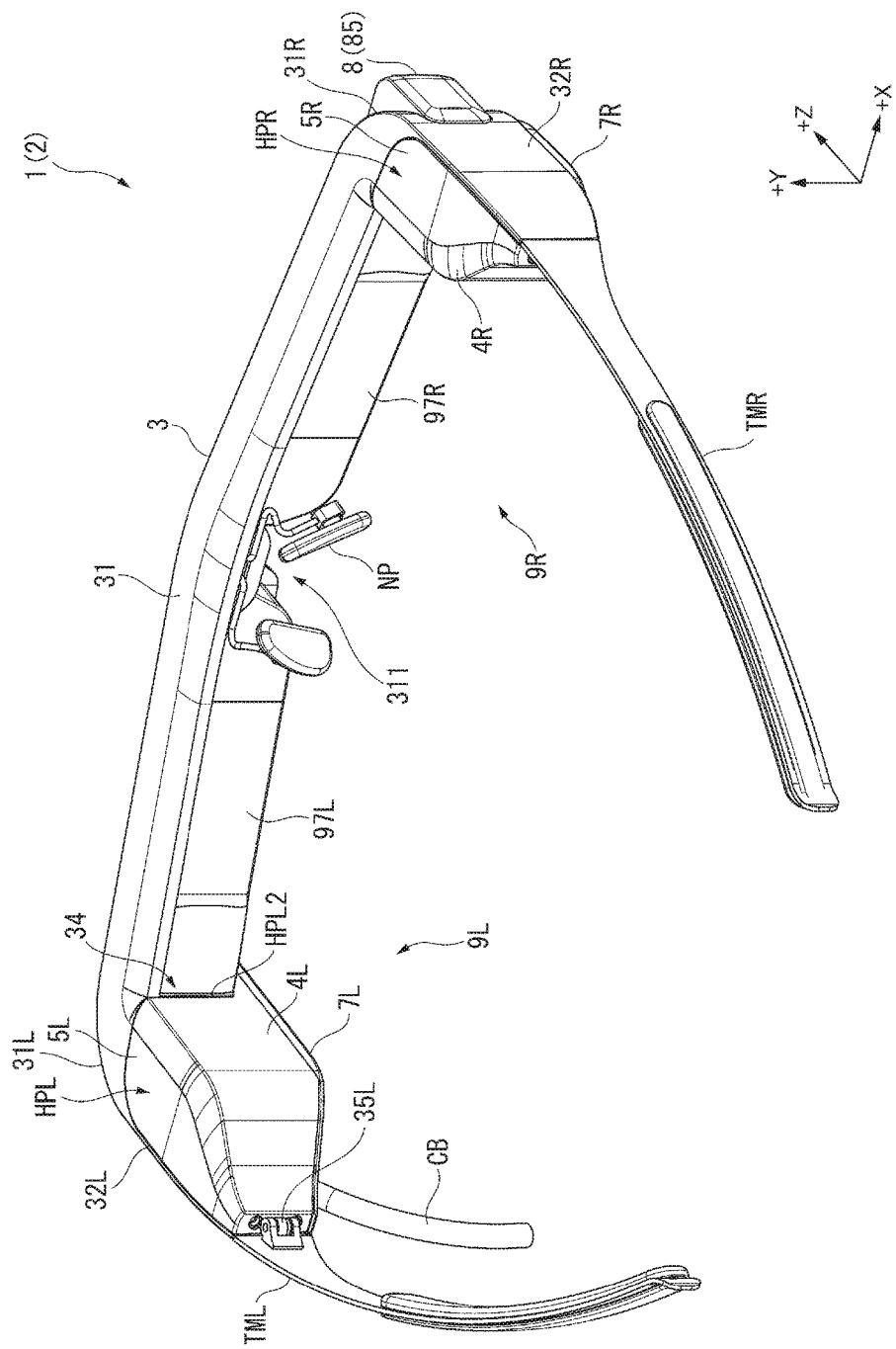
FIG. 4 is a perspective view showing the HMD on which nose pads and the light shielding member are mounted in the embodiment.

FIGS. 1 to 4 are perspective views showing exterior appearances of an HMD 1 according to the present embodiment. In detail, FIGS. 1 and 3 are perspective views of the HMD 1 viewed from the front side and from above. FIG. 2 is a perspective view of the HMD 1 viewed from the rear side and from below. FIG. 4 is a perspective view of the HMD 1 viewed from the rear side and from above. FIG. 3 shows the HMD 1 on which a lens holder LH and a light shielding member SD are mounted. FIG. 4 shows the HMD on which nose pads NP and the light shielding member SD are mounted.

The HMD (head mounted display) 1 according to the present embodiment is a see-through-type head mounted image display apparatus that is mounted on a user's head for use, displays an image visually recognizable by the user, and transmits outside light to allow the user to view the outside.

The HMD 1 includes a frame 2, and an imaging device 8 (FIG. 1) and two optical devices 9R and 9L, which are supported by the frame 2, as shown in FIGS. 1 to 4. In addition, the HMD 1 is so configured that the nose pads NP (FIG. 4), the lens holder LH (FIG. 3), and the light shielding member SD (FIG. 3) are attachable to and detachable from the frame 2.

The HMD 1 according to the present embodiment is partly characterized in that an image projection section 91 and a control section 96 disposed in each of accommodation sections HPR and HPL can be waterproofed. The characteristic will be described later in detail.

In the following description, in a case where the user on whom the HMD 1 is mounted is viewed from the front, the side viewed through the HMD 1 is called a front side (or frontward), and the side opposite the front side is called a rear side (or rearward). Further, the upper side and the lower side of the HMD 1 correspond to the upper side and the lower side of the user, and the right side and the left side of the HMD 1 correspond to the right side and the left side of the user on whom the HMD 1 is mounted.

In the following figures and description, a +X direction, a +Y direction, and a +Z direction perpendicular to one another are set as follows: The +Z direction is the direction from the rear side toward the front side; the +Y direction is the direction from the lower side toward the upper side; and +X direction is the direction from the left side toward the right side. Further, the direction opposite the +Z direction is called a −Z direction for ease of description. The same holds true for a −Y direction and a −X direction.

Configuration of Nose Pad

The nose pads NP are so provided as to be addable and removable from the rear side to and from a mounting section 311, which is located between light guide members 97R and 97L, which will be described later, in a frame body 3 as shown in FIG. 4. The nose pads NP sandwich the user's nose (portions corresponding to wings of nose) from right and left in the state in which the HMD 1 is mounted on the user to prevent the HMD 1 from shifting rightward, leftward, or downward.

Configuration of Lens Holder

The lens holder LH has the configuration of temple-less glasses, as shown in FIG. 3. The lens holder LH is so provided as to hold right and left lenses for eyesight correction (not shown) and as to be addable and removable from the rear side to and from the mounting section 311 described above.

Configuration of Light Shielding Member

The light shielding member SD is so attached to the mounting section 311 described above as to be attachable thereto and detachable therefrom in such a way that the light shielding member SD covers the light guide members 97R and 97L on the front side, which is the side opposite the nose pads NP and the lens holder LH described above via the light guide members 97R and 97L, as shown in FIG. 3. The light shielding member SD shields at least part of outside light incident on the light guide members 97R and 97L to make the outside less visible for improvement in visibility of a displayed image.

Schematic Configuration of Frame

The frame 2 has the configuration of the frame of glasses and supports not only the imaging device 8 and the optical devices 9R and 9L but also supports the nose pads NP, the lens holder LH, and the light shielding member SD, as described above, as shown in FIGS. 1 to 4. The frame 2 has a frame body 3, which has a roughly U-letter shape when viewed from above, case members 4R and 4L, which are attached to the frame body 3, and temples TMR and TML, which are provided as part of the frame body 3.

Among the components described above, the right temple TMR and the left temple TML are parts that are so placed on the user's ears as to support the HMD 1. The temples TMR and TML are so connected to support sections 35R and 35L, which are provided as part of the frame body 3, as to be bendable toward the user. The temples TMR and TML, when extended roughly in parallel to corresponding side surface sections 32R and 32L, can be placed on the user's right and left ears, whereby the HMD 1 can be mounted on the head. On the other hand, in a case where the HMD 1 is not mounted on the user, the temples TMR and TML can be bent inward so that the temples TMR and TML are folded.

Each of the temples TMR and TML is formed of a plate into which an elastic member is fit, and the elastic member is made, for example, of rubber, has an H-shaped cross section, and has two exposed surfaces, a user-side surface and a surface opposite the user-side surface. The plate can be made of a synthetic resin or a metal, such as titanium. The elastic member is not necessarily configured as described above, and two elastic members may be glued to or fit into the user-side surface and the surface opposite the user-side surface of the plate, or one elastic member may be provided only on one of the surfaces.

The frame main body 3 has a front section 31, which extends along the user's forehead, and side surface sections 32R and 32L, which intersect the front section 31 and extend rearward (toward user's rear side) from the right and left ends of the front section 31 and therefore extend along the user's temples. The frame body 3 is a unitary molded part made of a metal and formed of the front section 31 and the side surface sections 32R and 32L integrated with each other.

The front section 31 is part of the frame body 3 and extends along the rightward/leftward direction. The front section 31 supports the light guide members 97R and 97L, which serve as a display section disposed in front of the user's right and left eyes, and further supports the nose pads NP, the lens holder LH, and the light shielding member SD via the mounting section 311 described above, which is located between the supported light guide members 97R and 97L. A left end section 31L and a right end section 31R of the front section 31 are curved rearward in an arcuate shape when viewed from above, and the imaging device 8, which will be described later, is disposed in the right end section 31R. The side surface section 32R extends rearward from the right end section 31R, and the side surface section 32L extends rearward from the left end section 31L.

The side surface section 32R is combined with the case member 4R to form an accommodation section HPR, which has an accommodation space S (FIGS. 7 and 8), which accommodates a right image projection section 91 and a right control section 96, which form the optical device 9R.

Similarly, the side surface section 32L is combined with the case member 4L to form an accommodation section HPL, which has an accommodation space S, which accommodates a left image projection section 91 and a left control section 96, which form the optical device 9L.

The side surface sections 32R and 32L and the case members 4R and 4 will be described later in detail.

Configuration of Imaging Device

Figure 5:
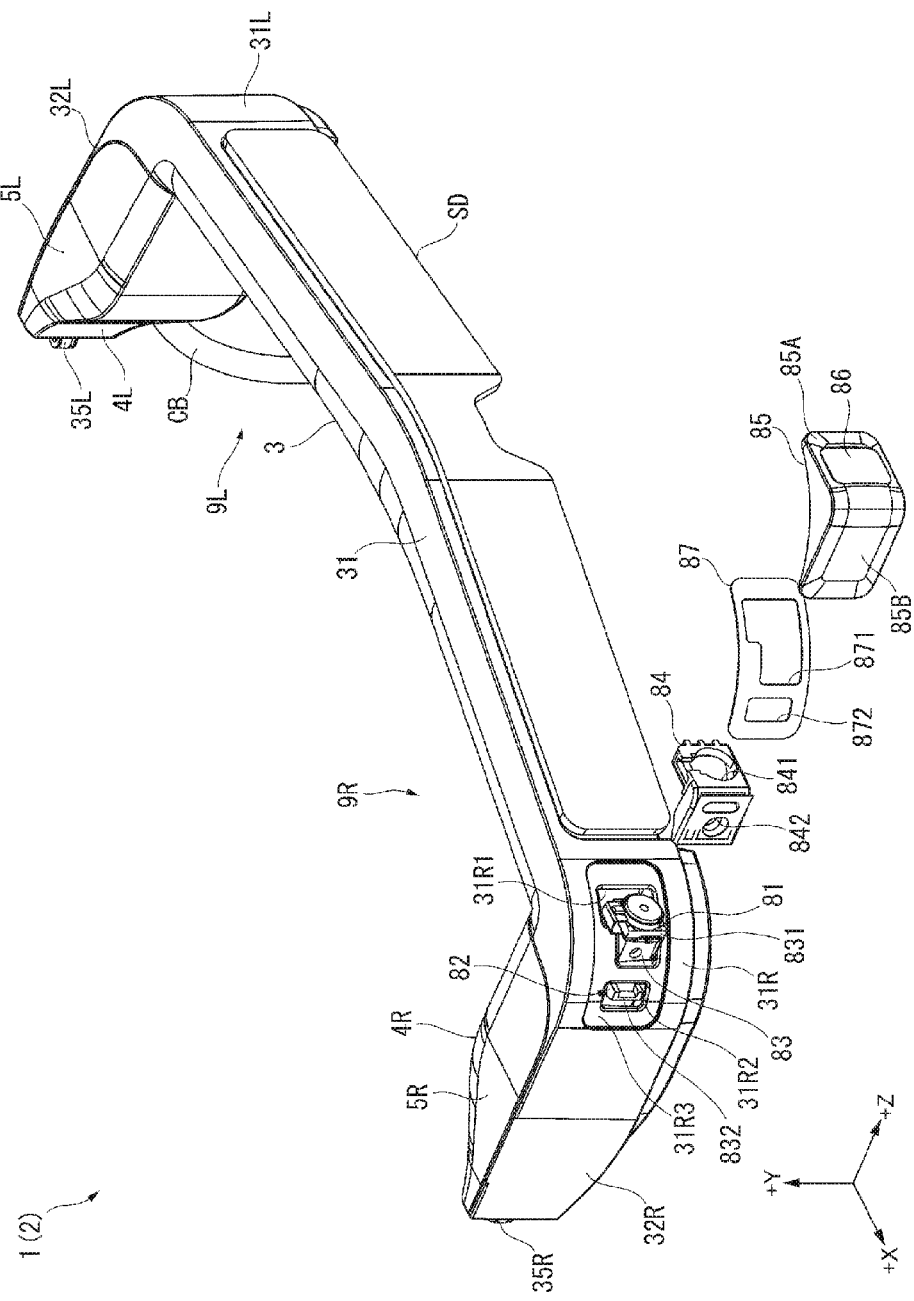
FIG. 5 is an exploded perspective view showing an imaging device in the embodiment.
Figure 6:
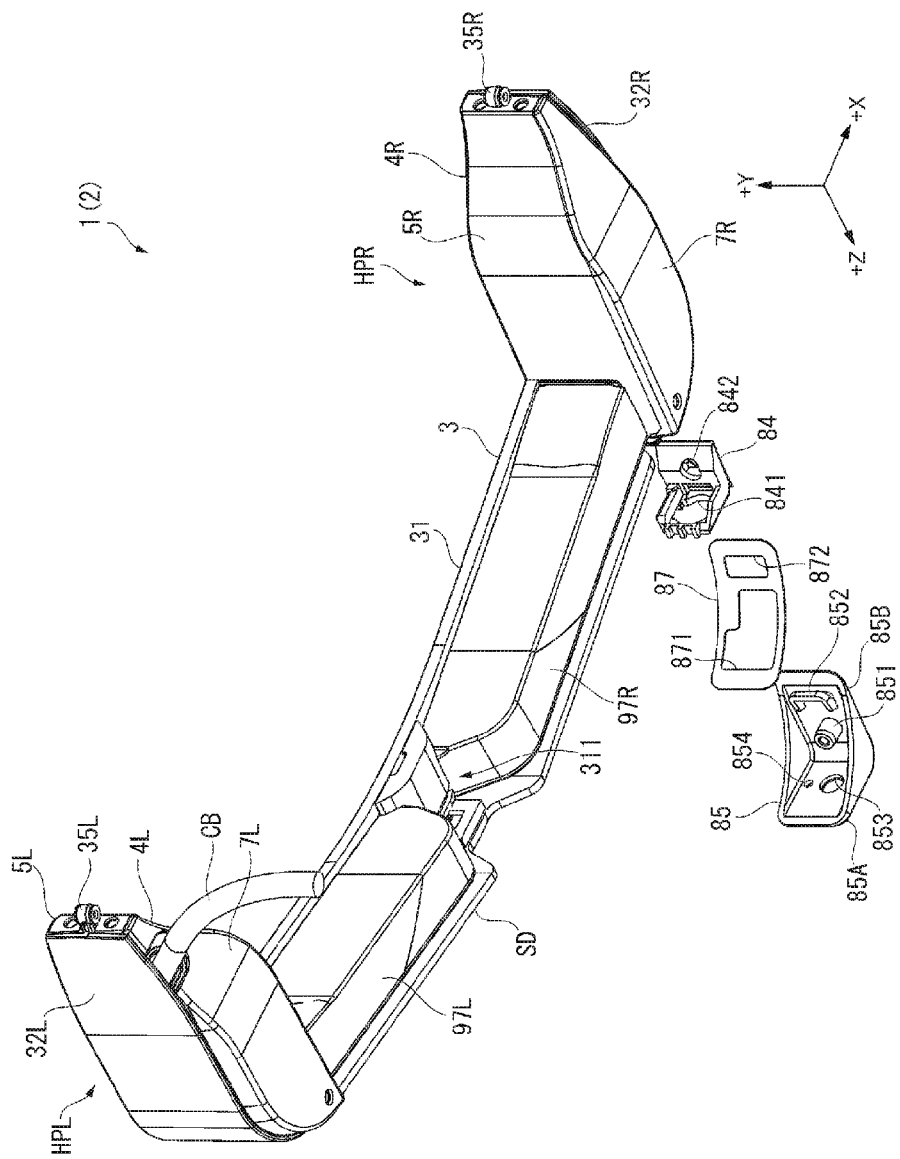
FIG. 6 is an exploded perspective view showing the imaging device in the embodiment.

FIGS. 5 and 6 are exploded perspective views showing the imaging device 8. Specifically, FIG. 5 is an exploded perspective view of the imaging device 8 viewed from the front side and from above, and FIG. 6 is an exploded perspective view of the imaging device 8 viewed from the rear side and from below.

The imaging device 8 is provided in the frame body 3, as shown in FIGS. 1 to 4. Specifically, the imaging device 8 is provided in the right end section 31R of the front section 31. The imaging device 8 includes an imaging section 81, a light emitting section 82, a first support member 83, a second support member 84, a cover member 85, a light transmissive member 86, and a waterproof member 87, as shown in FIGS. 5 and 6.

The imaging section 81 includes an imaging element, such as a CCD (charge-coupled device) image sensor and a CMOS (complementary metal oxide semiconductor) image sensor, and a light emitting element that illuminates an object to be imaged. The imaging section 81 is disposed in an opening 31R1, which is formed in the right end section 31R described above, in such a way that the imaging direction of the imaging element and the illumination direction of the light emitting element face a region in front of the HMD 1. The thus configured imaging section 81 captures an image of an area in front of the user through the light transmissive member 86 attached to the cover member 85.

The light emitting section 82 has a light emitting element, such as an LED (light emitting diode), and is disposed in an opening 31R2, which is formed in the right end section 31R described above, in such a way that the light emitting element outputs light sideways (rightward). The thus configured light emitting section 82 notifies the state of the action of the imaging device 8 and lights up during the period for which the imaging section 81 performs imaging. The light emitted from the light emitting section 82 is visible from the outside through the cover member 85.

The first support member 83 has a shape that follows the inner surface of the right end section 31R described above and is disposed inside the right end section 31R. The first support member 83 has a support section 831, part of which is disposed in the opening 31R1 and which supports the imaging section 81 described above, and a support section 832, part of which is disposed in the opening 31R2 and which supports the light emitting section 82.

The second support member 84 has a roughly L-letter shape when viewed from above and is combined with the first support member 83 to support the imaging section 81 and the light emitting section 82. The second support member 84 has a circular opening 841, which exposes the imaging section 81, and a circular opening 842, which exposes the light emitting section 82.

The cover member 85 is attached to the right end section 31R described above with part of the cover member 85 or protrusions 851 and 852 (FIG. 6), which are so provided as to protrude from the rear surface of the cover member 85, fit into the openings 31R1 and 31R2, so that the cover member 85 covers the second support member 84 from the front side. The cover member 85 is formed in a roughly L-letter shape having an end surface 85A, which is perpendicular to the +Z direction, and an end surface 85B, which is perpendicular to the +X direction. The light transmissive member 86 (FIG. 5), which guides outside light to the imaging section 81, is disposed on the end surface 85A, and an opening 853 (FIG. 6), which guides the light passing through the light transmissive member 86 to the imaging section 81, and a passage port 854 (FIG. 6), through which the light emitted from the light emitting section in the imaging section 81 passes, are formed in the end surface 85A. The thus configured cover member 85 is made of a resin that makes the inside behind the cover member 85 hardly visible but allows light transmission through the cover member 85 so that the light-up state of the light emitting section 82 described above is visible from the outside.

If the light transmissive member 86 has a circular shape, the exterior appearance of the imaging device 8 looks indeed like the exterior appearance of a camera, possibly giving persons around the user of the apparatus a sense of unease and causing them to think that "a camera is aimed at them" even when the imaging section 81 is not in operation. To lessen such a sense of unease, the light transmissive member 86 has a rectangular shape, which is unlikely to cause the persons around the user of the apparatus to take the imaging device 8 to be a camera. The light transmissive member 86 may be configured to function as a lens as long as the lens prevents water or dust from entering the imaging device 8 and further prevents the surface of the light transmissive member 86 from being scratched or otherwise damaged.

The right end section 31R, on which the thus configured cover member 85 is disposed, has a stepped section 31R3 having a rectangular shape according to the shape of the cover member 85, and the cover member 85 is disposed on the stepped section 31R3. The stepped section 31R3 is recessed inward from the outer surface of the right end section 31R by a certain amount, and a roughly entire region of the stepped section 31R3 is covered with the cover member 85 attached thereto.

The waterproof member 87 is formed of a waterproof sheet formed in a sheet-like shape. The waterproof member 87 has openings 871 and 872 that conform to the openings 31R1 and 31R2. The waterproof member 87 is disposed between the stepped section 31R3 and the cover member 85 to prevent a gap that allows entry of rain, sweat, and other types of liquid from being formed between the stepped section 31R3 and the cover member 85.

The thus configured imaging device 8 is controlled by the control section 96 disposed in the accommodation section HPR and outputs a captured image to the control section 96. The light-up state of the light emitting section is also controlled by the control section 96.

Configuration of Optical Device

Figure 7:
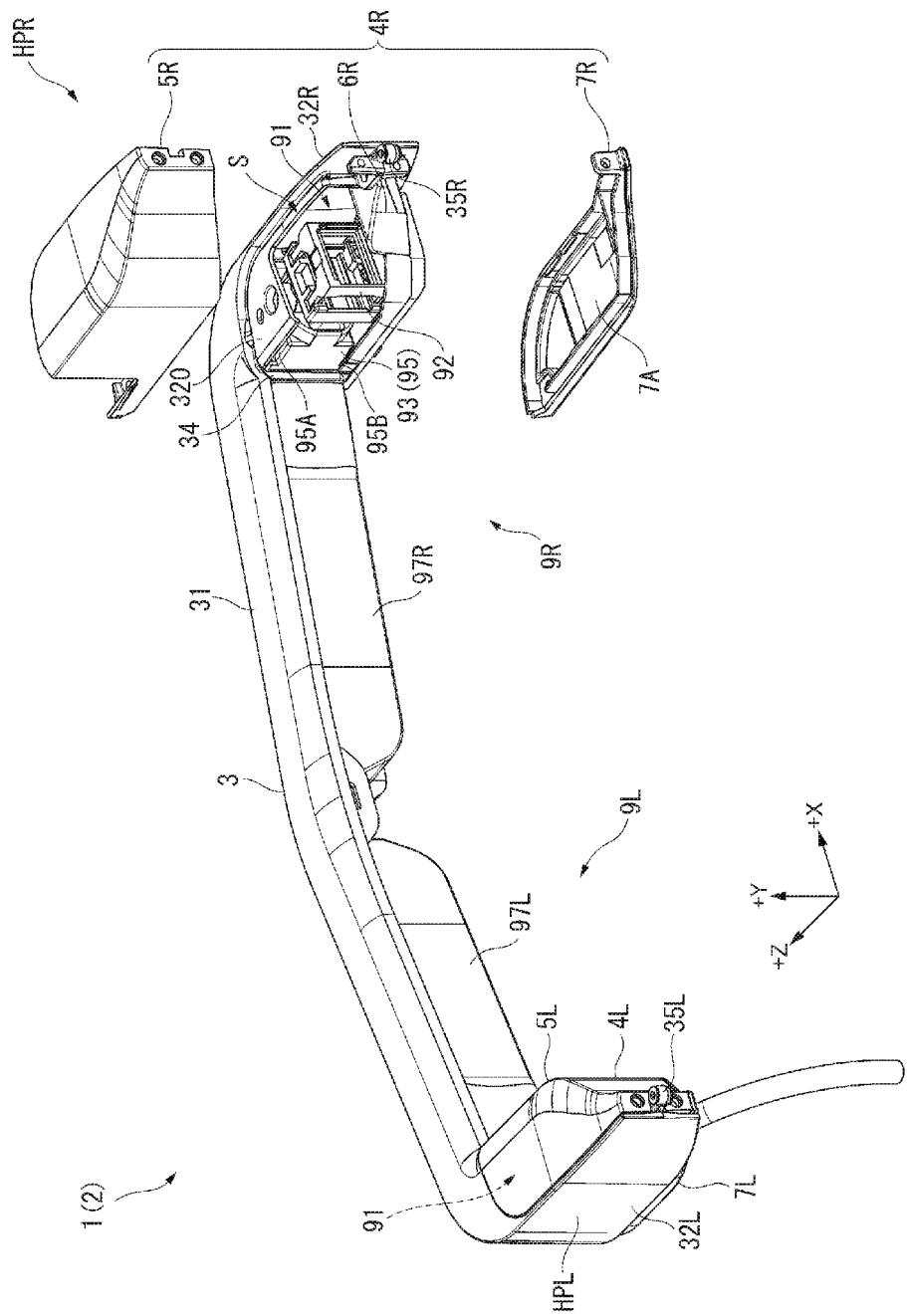
FIG. 7 is a perspective view showing the HMD with an upper case and a lower case removed in the embodiment.
Figure 8:
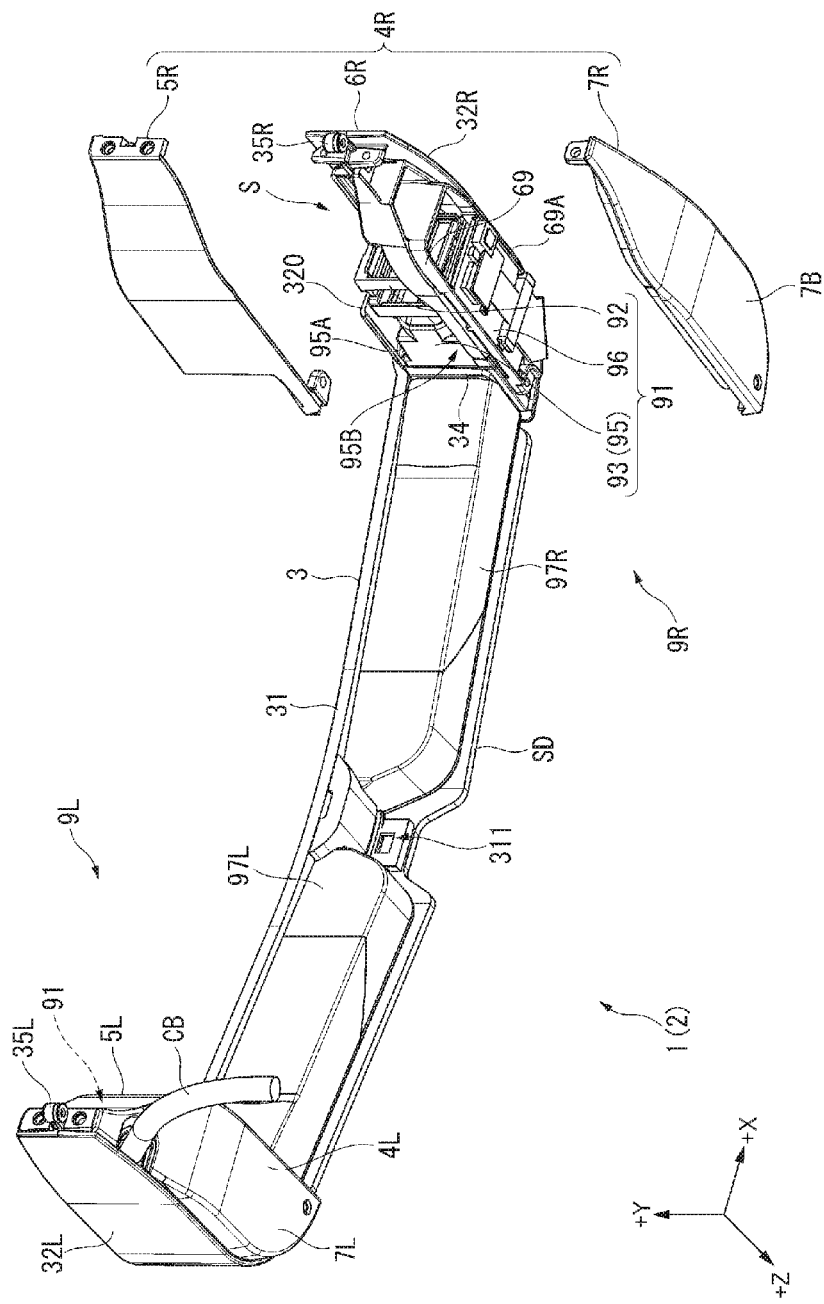
FIG. 8 is a perspective view showing the HMD with the upper case and the lower case removed in the embodiment.

FIGS. 7 and 8 are perspective views of the HMD 1 viewed from the rear side and from above and below, respectively, with an upper case 5R and a lower case 7R, which form the case member 4R, removed. In FIGS. 7 and 8, the temples TMR and TML are omitted.

The optical device 9R is located on the right side of the frame 2, and the optical device 9L is located on the left side of the frame 2. The optical devices 9R and 9L display images according to an externally inputted image signal and visually recognizable by the user. Out of the two optical devices, the optical device 9R includes the image projection section 91 and the control section 96, which are disposed in the accommodation section HPR, which is the combination of the side surface section 32R and the case member 4R, and further includes the light guide member 97R, which is supported by the front section 31 described above, as shown in FIGS. 7 and 8.

The following description will be primarily made of the optical device 9R. It is, however, noted that the optical device 9L, which is a mirror-symmetric version of the optical device 9R, also includes the image projection section 91, the control section 96, and the light guide member 97L, which are the same as those in the optical device 9R.

Configuration of Image Projection Section

Figure 9:
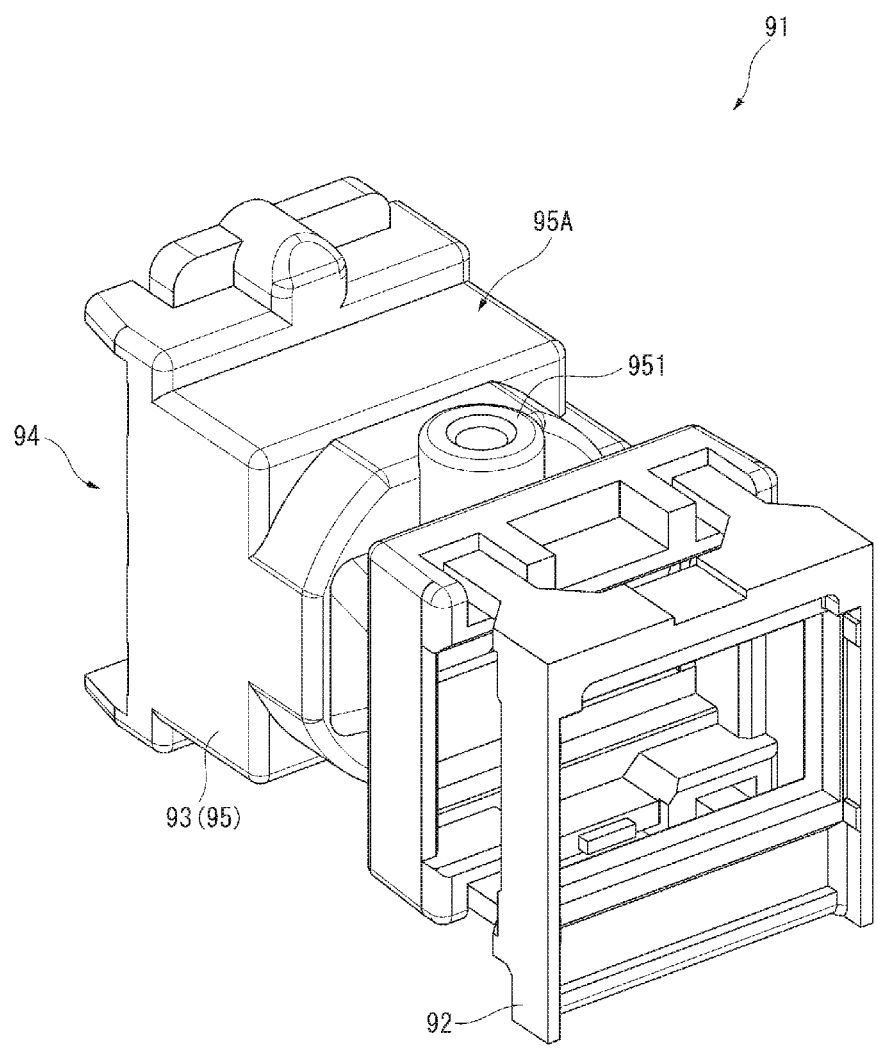
FIG. 9 is a perspective view showing an image projection section in the embodiment.
Figure 10:
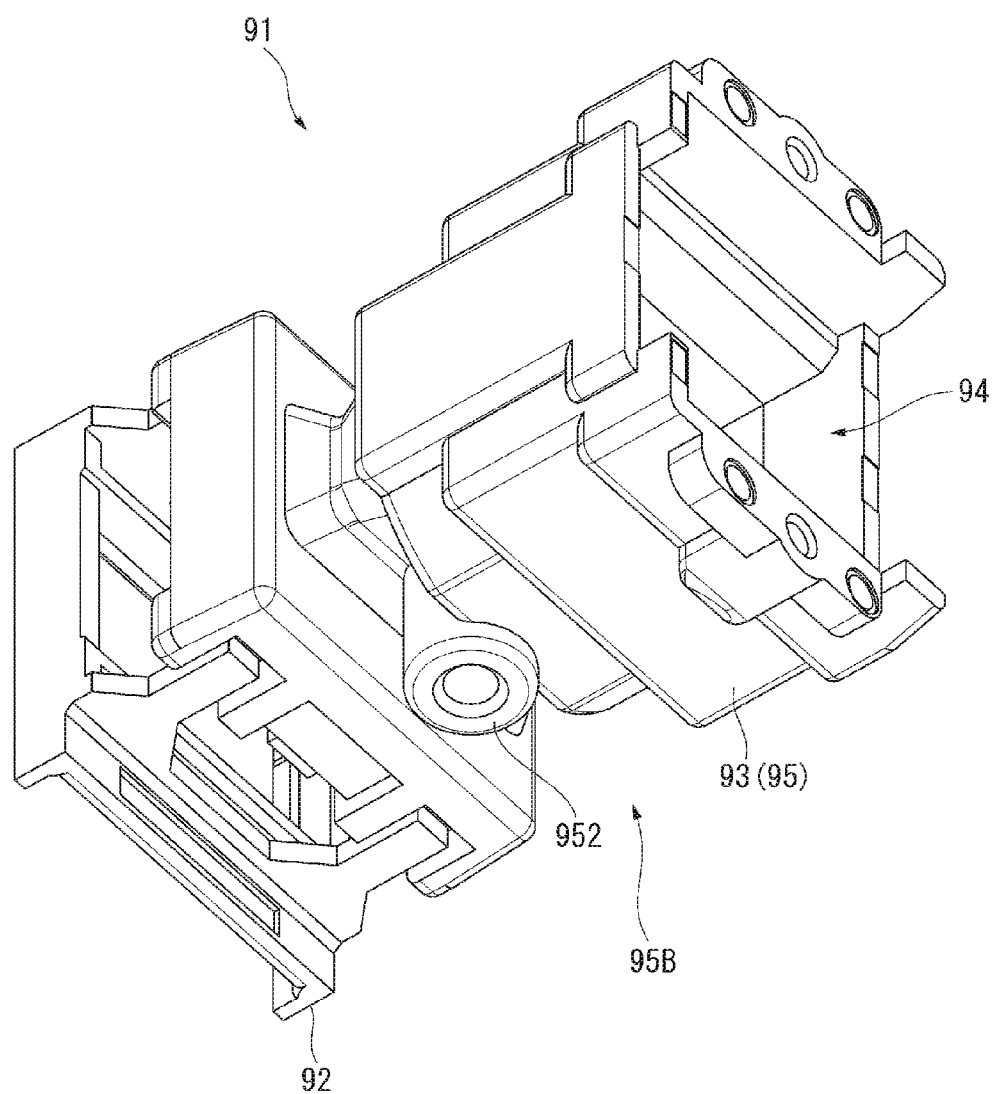
FIG. 10 is a perspective view showing the image projection section in the embodiment.

FIG. 9 is a perspective view of one of the image projection sections 91 viewed from the side (rear side) opposite the image light projection side and from above, and FIG. 10 is a perspective view of the image projection section 91 viewed from the image light projection side (front side) and from below. In FIGS. 9 and 10, a frame body of an image formation device 92 is shown, but a display panel is omitted.

The image projection section 91 in each of the optical devices 9R and 9L projects image light (image forming light) to the corresponding one of the light guide members 97R and 97L and is one of the members accommodated in the corresponding one of the accommodation sections HPR and HPL. The image projection section 91 is configured as a unit formed of the image formation device 92 and a projection optical device 93 combined and integrated with each other, as shown in FIGS. 9 and 10.

The image formation device 92 is an image formation section that forms, under the control of the control section 96, image light according to an image signal externally inputted via a cable CB. The image formation device 92 is formed of a self-luminous display panel, such as an organic EL (electro-luminescence) panel, in the present embodiment, but not necessarily, and can be formed of the combination of a light source, such as an LED, and a light modulator, such as a transmissive or reflective liquid crystal panel and a device using micromirrors, such as MEMS mirrors.

The thus configured image formation device 92 is connected to the frame body 3 (fixing section 320, which will be described later, or side surface section 32R or 32L) via a heat conductive member that is not shown. Heat generated by the image formation device 92 can thus be transferred to the frame body 3, which is formed of a metal member and exposed to the outside, and dissipated out of the frame body 3.

The projection optical device 93 outputs the image light formed by the image formation device 92 to the corresponding one of the light guide members 97R and 97L. The projection optical device 93 is formed as an assembled lens including a plurality of lenses 94 and a lens barrel 95, which accommodates the plurality of lenses 94. A prism (projection prism) can be used in place of at least one of the plurality of lenses as long as the prism can guide the image light incident from the image formation device 92 to the corresponding one of the light guide members 97R and 97L.

The lens barrel 95 has a fixing section 951, which is a threaded hole formed in an upper end surface 95A, as shown in FIG. 9, and a fixing section 952, which is a threaded hole formed in a lower end surface 95B, as shown in FIG. 10. The lens barrel 95 is fixed to the fixing section 320 of the side surface section 32R via the fixing section 951, as shown in FIG. 7. A substrate holder 6R is attached to the fixing section 952 of the lens barrel 95, as shown in FIG. 8. That is, the image projection section 91 including the lens barrel 95 is covered with the substrate holder 6R from below. Although not shown, the image projection section 91 in the optical device 9L is also covered with a substrate holder having the same configuration from below.

The control section 96 that forms the optical device 9L causes the image formation device 92 that also forms the optical device 9L to operate in accordance with an image signal externally supplied via the cable CB connected to the left accommodation section HPL. The control section 96 that forms the optical device 9R causes the image formation device 92 that also forms the optical device 9R to operate in accordance with the image signal inputted from the control section 96 in the optical device 9L via a signal line (not shown) that passes through the space between the front section 31 described above and the light guide members 97R, 97L. Each of the control sections 96 is also one of the members accommodated in the corresponding one of the accommodation sections HPR and HPL.

A control circuit that controls the imaging device 8 described above is implemented in the control section 96 in the optical device 9R.

The right light guide member 97R and the left light guide member 97L form the display section according to an aspect of the invention. The light guide members 97R and 97L are disposed in front of the user's right and left eyes and guide the image light outputted from the respective image projection sections 91 to the user's right and left eyes.

Specifically, the light guide member 97R causes the image light for the right eye projected from the image projection section 91 in the optical device 9R to undergo internal reflection that occurs at the surface of the light guide member 97R and travel toward the center of the light guide member 97R and guides the image light to the user's right eye via a semi-transmissive layer provided in a position according to the right eye. The same holds true for the light guide member 97L, which guides the image light for the left eye to the left eye.

Each of the light guide members 97R and 97L is made of a resin having high light transmittance in the visible light region (cycloolefin polymer, for example). The user can therefore view the outside through the light guide members 97R and 97L disposed in front of the right and left eyes.

Configuration of Side Surface Section

Figure 11:
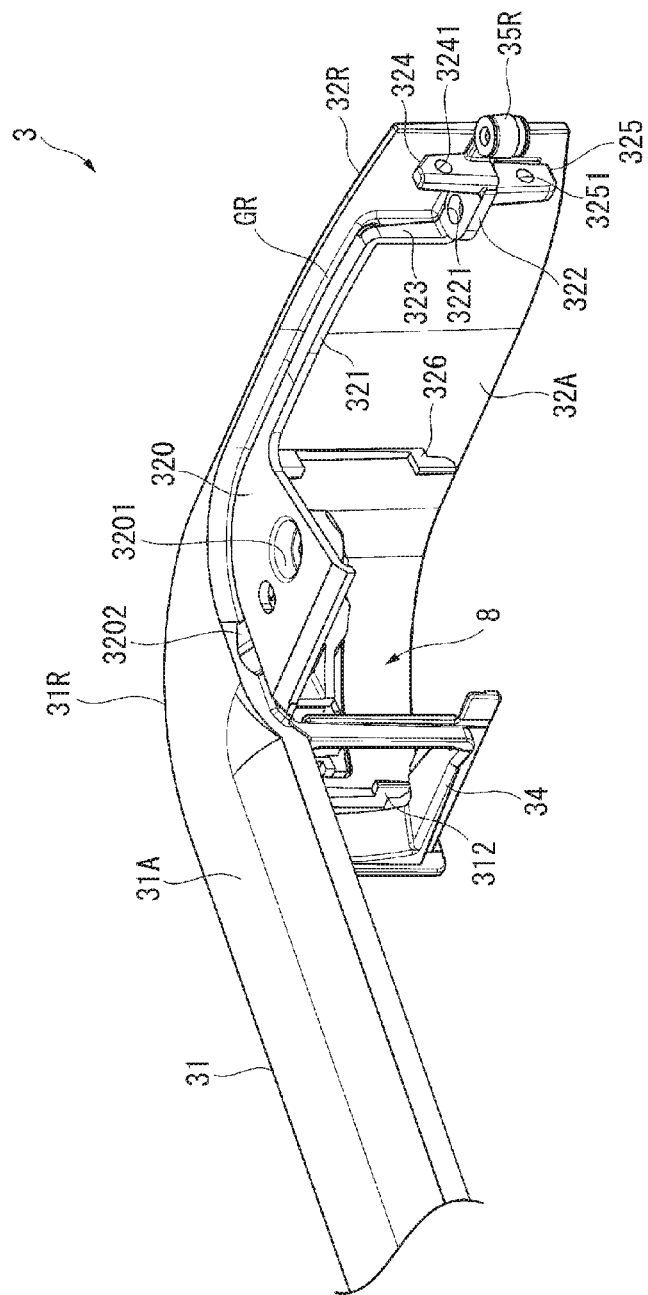
FIG. 11 is a perspective view showing a frame body in the embodiment.
Figure 12:
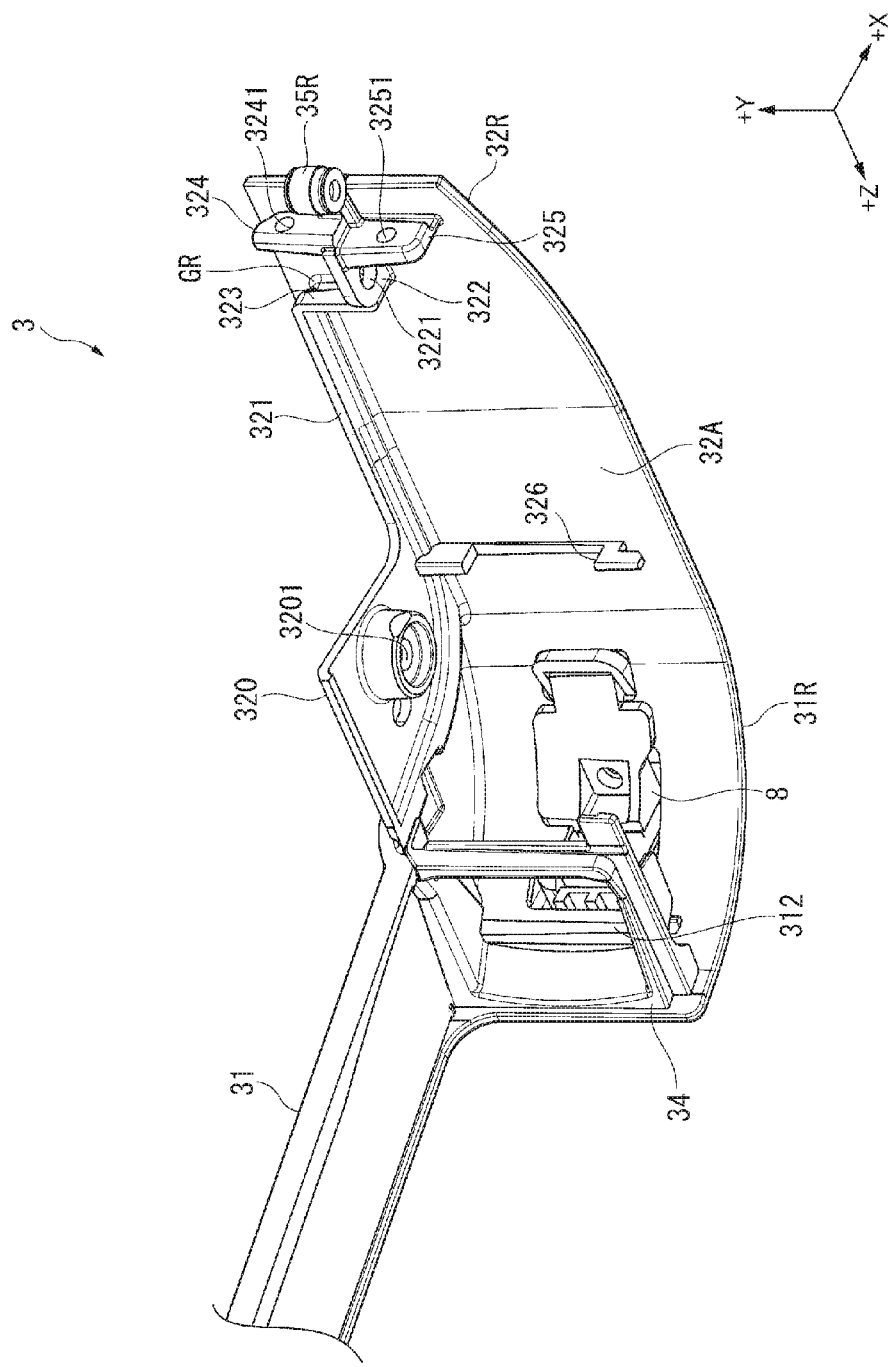
FIG. 12 is a perspective view showing the frame body in the embodiment.

FIGS. 11 and 12 are perspective views showing the frame body 3. Specifically, FIG. 11 is a perspective view of an inner surface 32A of the side surface section 32R, which forms the frame body 3, viewed from the rear side and from above, and FIG. 12 is a perspective view of the inner surface 32A viewed from the rear side and from below.

The frame body 3 corresponds to the frame member according to an aspect of the invention. The frame body 3 has the front section 31 and the right and left side surface sections 32R, 32L, as described above.

The side surface section 32R has the fixing section 320, which is raised from the inner surface 32A on the user side and connected to the upper surface of the right end section 31R described above, and ribs 321 to 325, which serve as a second rib and are also raised from the inner surface 32A, as shown in FIGS. 11 and 12.

The fixing section 320 is located on the rear side of the right end section 31R of the front section 31 described above and in a position lowered downward from an upper end surface 31A of the front section 31. The fixing section 320 is a flat surface portion along the rightward/leftward direction (flat surface portion along XZ plane).

The fixing section 320 has a hole 3201, through which a screw to be screwed into the fixing section 951 of the lens barrel 95, which is disposed below the fixing section 320, is inserted from above, and a protrusion 3202, which is located at the front-side edge of the fixing section 320 and provided to position the upper case 5R.

It can be said that the thus configured fixing section 320, which protrudes from the inner surface 32A of the side surface section 32R, is a rib having a large amount of protrusion.

Although not shown, the side surface section 32L also has a fixing section 320 having the same configuration.

The ribs 321 and 322 extend along the extending direction of the side surface section 32R from the front section 31. Specifically, the rib 321 is located in a position close to the upper end of the side surface section 32R and extends as a continuation of the fixing section 320 described above to a position close to the rear-side end of the side surface section 32R. That is, the rib 321, along with the fixing section 320, extends from the front-side end of the side surface section 32R toward the rear side thereof along the extending direction of the side surface section 32R from the front section 31.

The rib 322 is formed roughly at the center of the side surface section 32R in the upward/downward direction and in a rear-side position of the side surface section 32R.

The ribs 323 to 325 extend along a direction (second direction) roughly perpendicular to the extending direction of the side surface section 32R from the front section 31. Specifically, the rib 323 connects the rear-side end of the rib 321 to the front-side end of the rib 322. The rib 324 extends upward from the rear-side end of the rib 322, and the rib 325 extends downward from the rear-side end of the rib 322. The ribs 324 and 325 are connected to the support section 35R, by which the temple TMR is pivotally supported. That is, the support section 35R is formed integrally with the side surface section 32R.

The thus configured ribs 321 to 325 have the function of increasing the strength of the side surface section 32R.

Among the ribs, each of the ribs 322, 324, and 325 has a case fixing section that fixes the case member 4R.

Specifically, a case fixing section 3221 of the rib 322 is a hole through which a screw inserted through the substrate holder 6R and screwed into a threaded hole 516 (FIG. 15) of the upper case 5R is inserted.

A fixing section 3241 of the rib 324 is a threaded hole into which a screw inserted through the upper case 5R is screwed from the rear.

A fixing section 3251 of the rib 325 is a threaded hole into which a screw inserted through the upper case 5R and the lower case 7R is screwed.

As described above, rear-side end portions of the upper case 5R, the substrate holder 6R, and the lower case 7R are fixed to the ribs 322, 324, and 325 located on the rear side of the side surface section 32R.

Figure 13:
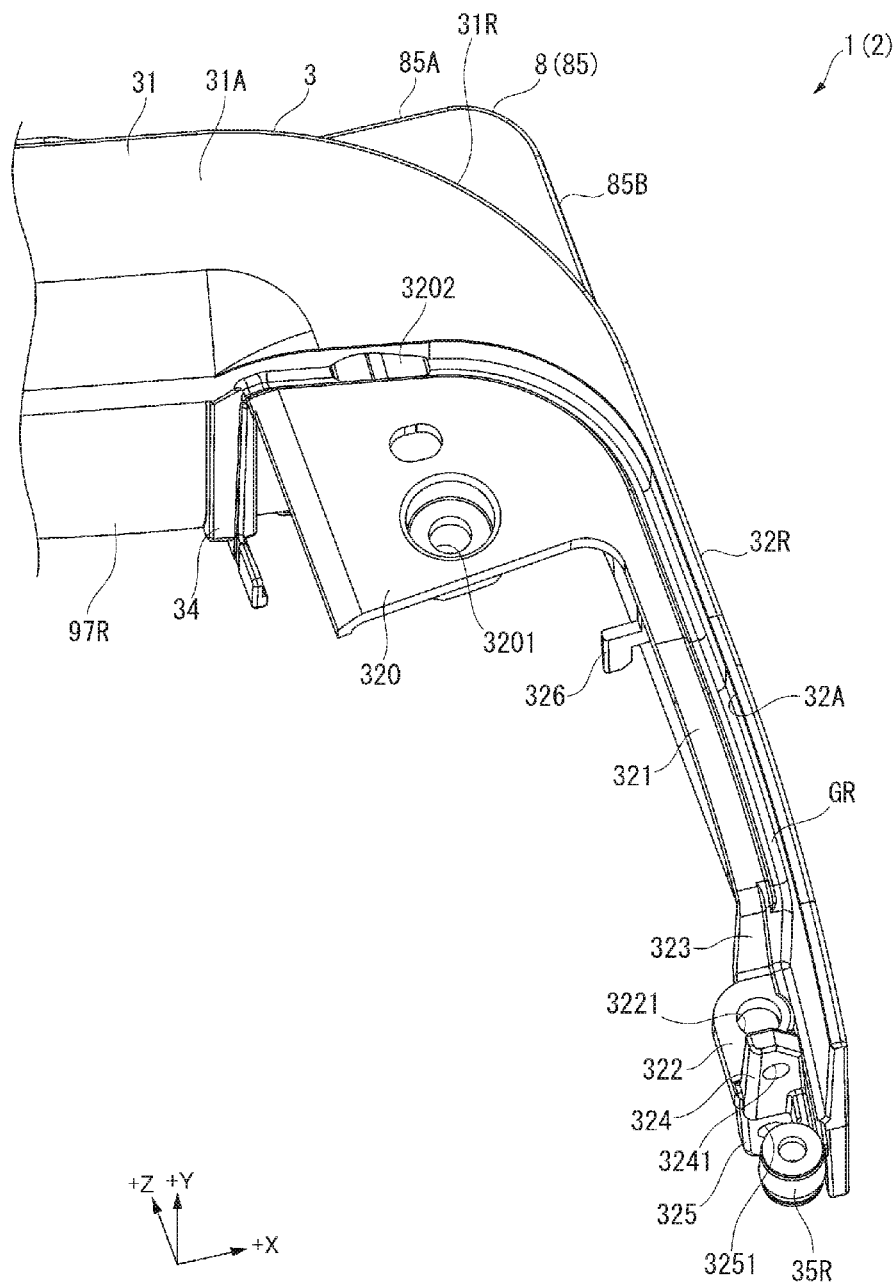
FIG. 13 shows a groove formed in ribs in the embodiment.
Figure 14:
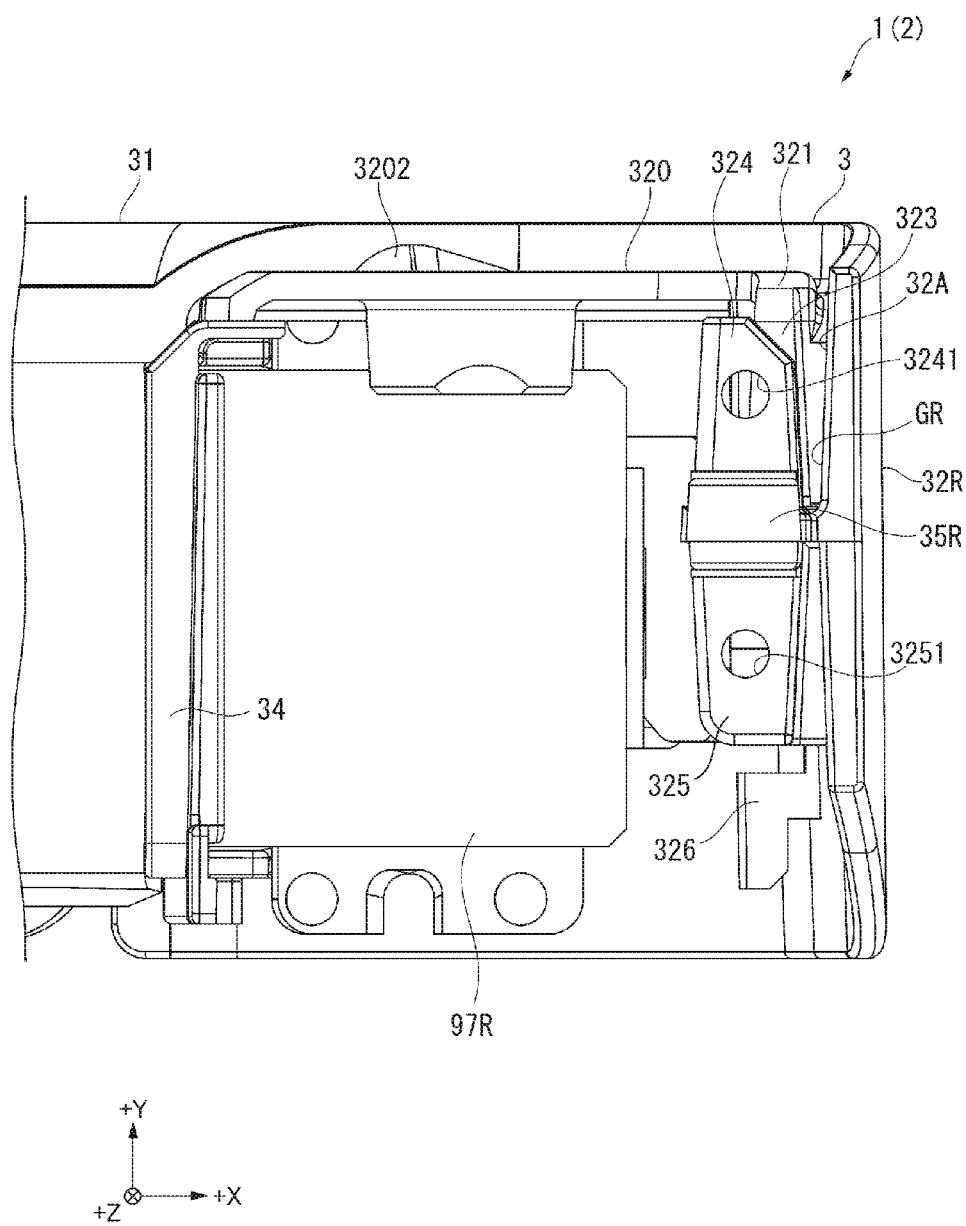
FIG. 14 shows the groove formed in the ribs in the embodiment.

FIGS. 13 and 14 show a groove GR formed in the fixing section 320 and the ribs 321 to 324 described above. In detail, FIG. 13 is a perspective view of the groove GR viewed from the rear side and from above, and FIG. 14 is a rear view of the groove GR.

Among the ribs 321 to 325 described above, the groove GR is formed in the ribs 321 to 324 and the fixing section 320, which are connected to each other, as shown in FIGS. 13 and 14. In detail, the groove GR, which extends along the extending direction of the side surface section 32R from the front section 31, is formed in the upper surfaces of the fixing section 320 and the ribs 321 to 324, which are connected to the fixing section 320 and reach a rear-side end portion of the side surface section 32R, in such a way that the inner surface 32A is connected to the inner surface of the groove GR. That is, the groove GR is formed over roughly the entire region from the end of the side surface section 32R on the side facing the front section 31 to the end of the side surface section 32R on the side opposite the front section 31. The front-side base end of the groove GR is located in a position close to the protrusion 3202 of the fixing section 320.

An engaging section 326, onto which a hook-shaped section 613 (FIG. 16) of the substrate holder 6R locks, is so provided as to protrude at roughly the center of the inner surface 32A described above, as shown in FIGS. 11 and 12. An engaging section 312, onto which a hook-shaped section 64 (FIG. 16) of the substrate holder 6R locks, is formed on the inner surface of the right end section 31R of the front section 31.

Although not shown, the side surface section 32L, the structure of which is a mirror-symmetric version of the structure of the side surface section 32R, also has a fixing section 320, ribs 321 to 325, and an engaging section 326 having the same configurations described above, and an engaging section having the same configuration as that of the engaging section 312 is so provided as to protrude from the inner surface of the left end section 31L.

Configuration of Case Member

The case member 4R, which is combined with the side surface section 32R to form the accommodation section HPR, has the upper case 5R, the substrate holder 6R, and the lower case 7R, as shown in FIGS. 7 and 8. Among the components described above, the upper case 5R and the lower case 7R form the outer case according to an aspect of the invention.

The case member 4L, which is combined with the side surface section 32L to form the accommodation section HPL, also has an upper case 5L, a substrate holder (not shown), and a lower case 7L, the structures of which are mirror-symmetric versions of the structures of the upper case 5R, the substrate holder 6R, and the lower case 7R. The upper case 5L and the lower case 7L also form the outer case according to an aspect of the invention, as in the upper case 5R and the lower case 7R described above do.

Configuration of Upper Case

Figure 15:
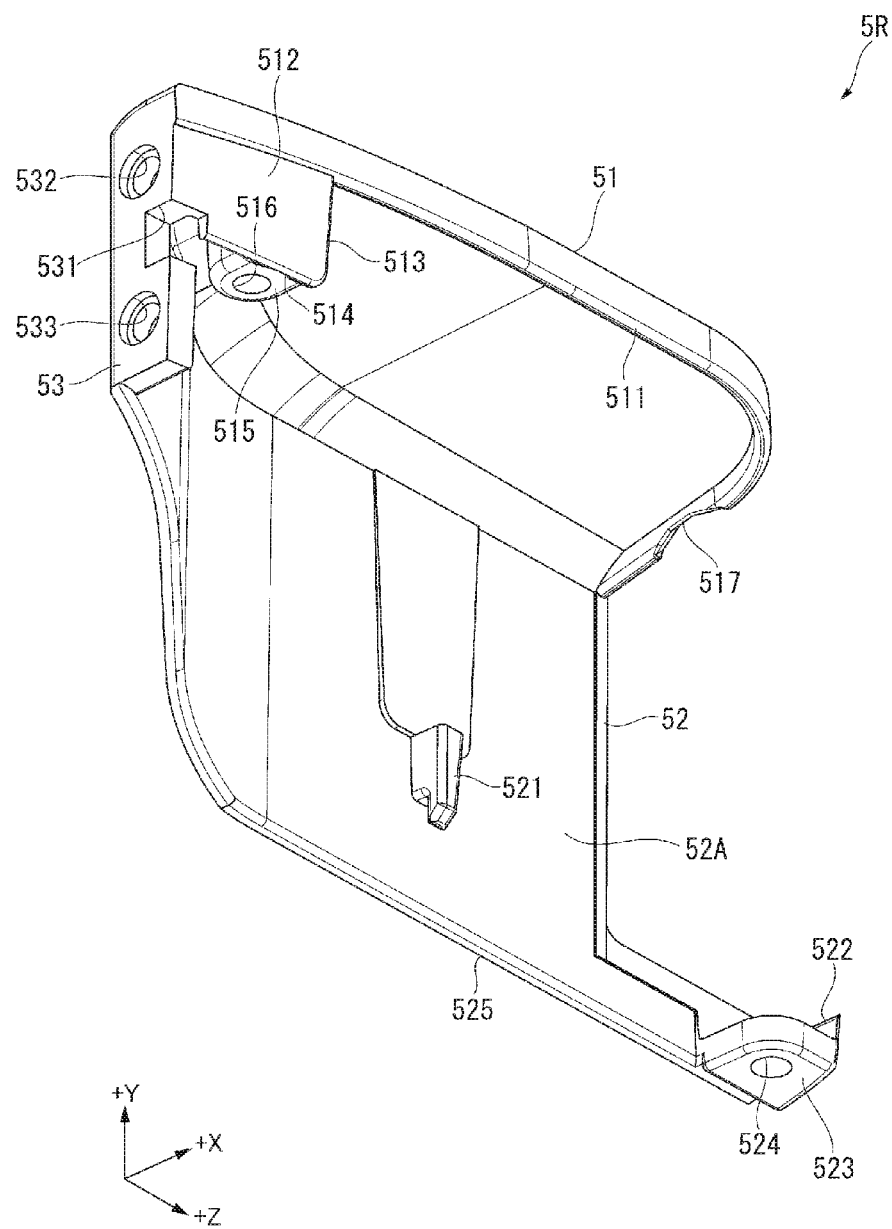
FIG. 15 is a perspective view showing an upper case in the embodiment.

FIG. 15 is a perspective view of the upper case 5R viewed from the side facing the side surface section 32R and from below.

The upper case 5R is a member that covers the image projection section 91 from above. The upper case 5R has an upper surface section 51, which is connected to the side surface section 32R, a side surface section 52, which extends downward from the user-side end of the upper surface section 51 and faces the side surface section 32R, and a rear surface section 53, which intersects the upper surface section 51 and the side surface section 52, as shown in FIG. 15.

The upper surface section 51 has a protrusion 511, which is located at the end edge opposite the side surface section 52 and protrudes downward along the end edge. The upper surface section 51 further has a protrusion 512, which is located at a rear-side portion of the opposite end edge and protrudes downward beyond the protrusion 511. Out of the protrusions, the front end surface of the protrusion 511 is inserted into the groove GR formed in the fixing section 320 and the rib 321 described above, when the upper case 5R is combined with the side surface section 32R, and comes into contact with the bottom of the groove GR. The protrusion 512 is further inserted into the groove GR formed in the ribs 323 and 322 described above, and a front-side end edge 513 and a lower end edge 514 of the protrusion 512 come into contact with the bottom of the groove GR formed in the ribs 323 and 322. That is, the protrusions 511 and 512 form a unitary protruding strip that protrudes downward, are inserted into the groove GR formed in the fixing section 320 and the ribs 321 to 324, and come into contact with the bottom of the groove GR. The end edge 513, which extends along the upward/downward direction, does not need to come into contact with the bottom surface of a portion of the groove GR that faces the end edge 513.

A boss 515 is formed on the inner surface of the upper surface section 51 (surface facing downward) and protrudes from the inner surface, and the threaded hole 516 is formed in the boss 515.

A recess 517 is formed in the front-side end edge of the upper surface section 51. The protrusion 3202 of the fixing section 320 described above is fit into the recess 517 when the upper case 5R is combined with the frame body 3, whereby the upper case 5R is positioned.

The side surface section 52 has a hook-shaped section 521, protrusions 522 and 523, and a hole 524.

The hook-shaped section 521 is so formed on an inner surface 52A of the side surface section 52 (inner surface 52A facing side surface section 32R) as to face downward. The hook-shaped section 521 engages with the substrate holder 6R.

The protrusion 522 is so formed as to protrude from a front-side lower end portion of the side surface section 52 toward the front side.

The protrusion 523 protrudes from a front end portion of the protrusion 522 toward the side surface section 32R. The protrusion 523 is a portion to be combined with the lower case 7R.

The hole 524 is formed in the protrusion 523, and a screw inserted through the lower case 7R and screwed into the substrate holder 6R is inserted through the hole 524 from below.

A lower end section 525 of the thus configured side surface section 52 comes into contact with an upper surface 73A (FIG. 18) of an outer stepped section 73 of the lower case 7R when the upper case 5R is combined with the lower case 7R.

The rear surface section 53 is located on the rear side of the ribs 324 and 325 described above when the upper case 5R is combined with the side surface section 32R. The rear surface section 53 has a recess 531 roughly at the center thereof and two holes 532 and 533 in positions that sandwich the recess 531 from above and below.

The recess 531 is a recess for exposing the support section 35R connected to the ribs 324 and 325 of the side surface section 32R to the outside, and the recess 531 forms an opening HPR1, which will be described later.

Out of the holes 532 and 533, the hole 532, which is the upper hole, is a hole through which a screw fixed to the case fixing section 3241 described above is inserted, and the upper case 5R is fixed to the side surface section 32R when the screw is fixed to the case fixing section 3241.

The hole 533, which is the lower hole, is a hole through which a screw fixed to the case fixing section 3251 described above is inserted, and the screw is inserted through a hole 78 (FIG. 18) of the lower case 7R as well as the hole 533.

Configuration of Substrate Holder

Figure 16:
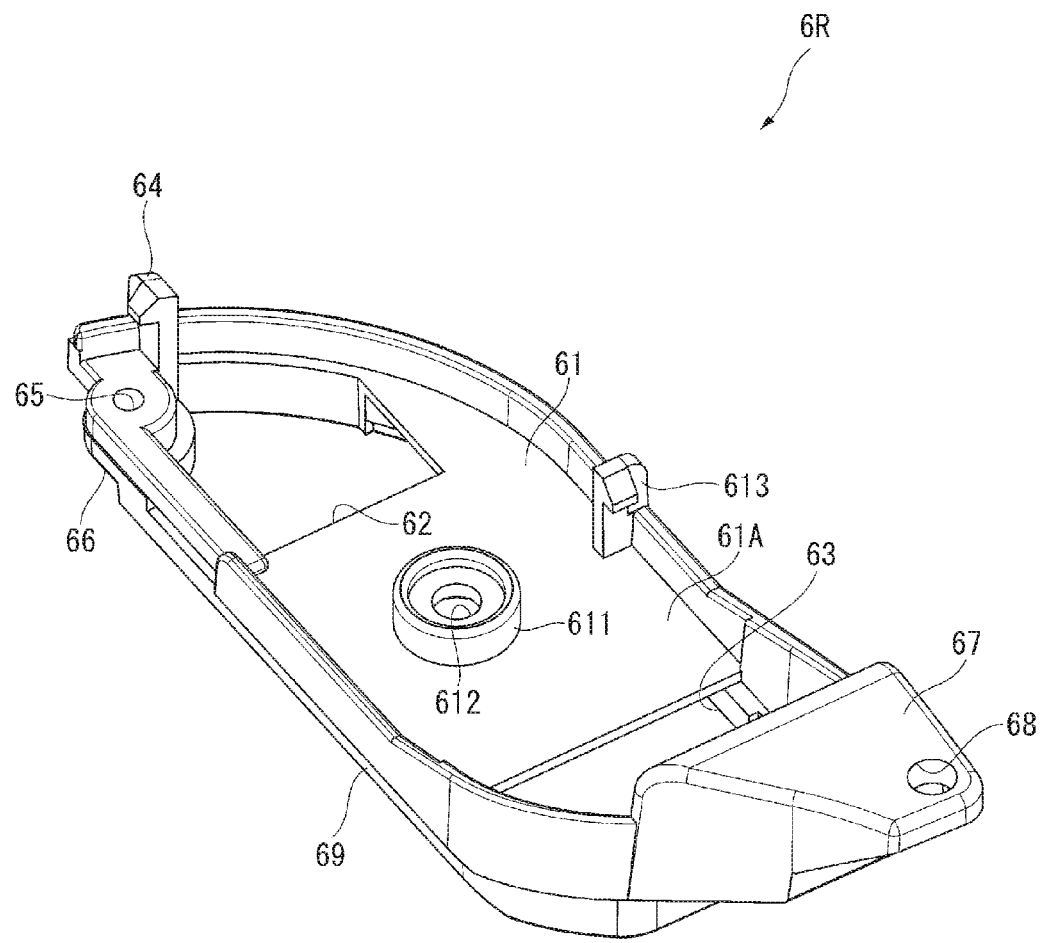
FIG. 16 is a perspective view showing a substrate holder in the embodiment.
Figure 16:
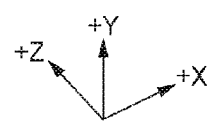
Figure 17:
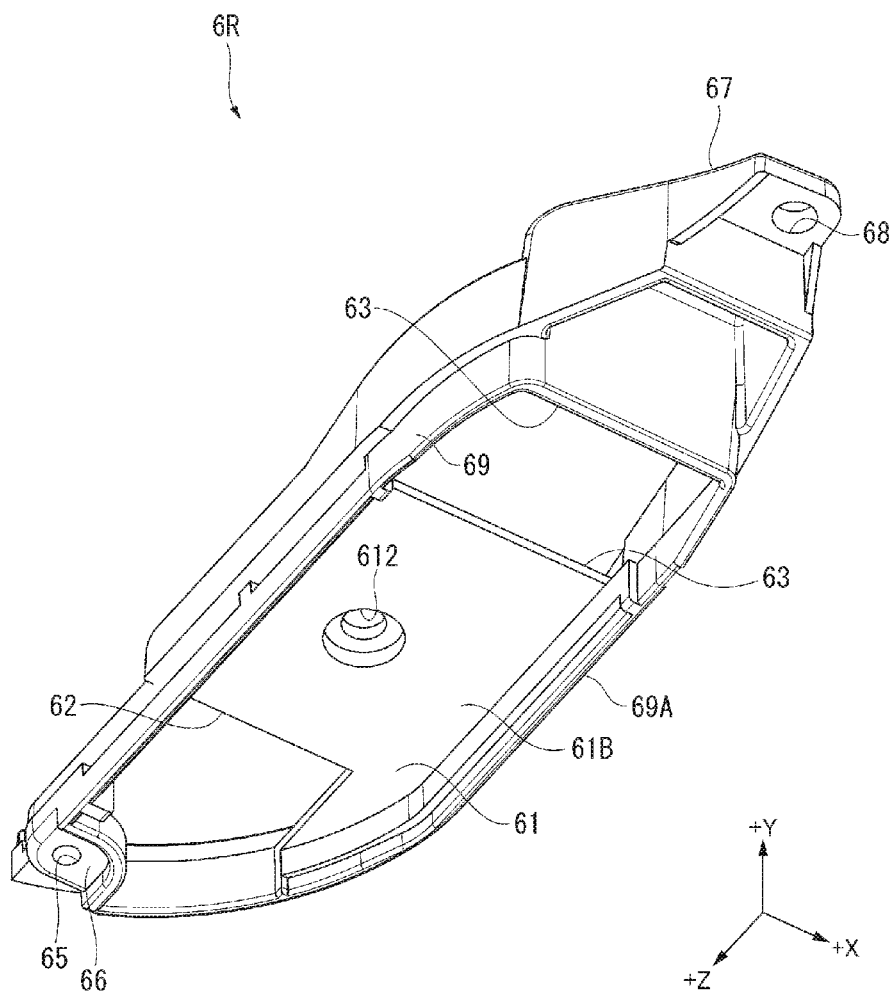
FIG. 17 is a perspective view showing the substrate holder in the embodiment.

FIG. 16 is a perspective view of the substrate holder 6R viewed from the rear side and from above, and FIG. 17 is a perspective view of the substrate holder 6R viewed from the rear side and from below.

The substrate holder 6R corresponds to the inner case according to an aspect of the invention and is a member that is fixed to the lens barrel 95 and covers the lens barrel 95 from below. The substrate holder 6R is formed in a frame shape having a circumferential edge raised upward with the right end edge of the substrate holder 6R extending along the side surface section 32R and the left and rear end edges of the substrate holder 6R extending along the left and rear end edges of the upper case 5R, as shown in FIGS. 16 and 17. The width dimension of the substrate holder 6R (dimension in +X direction, which is width direction) is smaller than the width dimension of the upper case 5R described above in the same direction, and the substrate holder 6R is disposed in the space surrounded by the upper case 5R and the side surface section 32R.

The thus configured substrate holder 6R has a fixing section 61, openings 62 and 63, the hook-shaped section 64, a threaded hole 65, a recess 66, a protrusion 67, a hole 68, and a lower end section 69.

The fixing section 61 is a portion that is formed in a flat-plate-like shape and located roughly at the center of the substrate holder 6R, has an upper surface 61A, to which the lens barrel 95 described above is fixed, and has a lower surface 61B, on which the control section 96 is disposed. A boss 611, which has a hole 612, is so provided roughly at the center of the upper surface 61A as to protrude upward. The substrate holder 6R is fixed to the lens barrel 95 when a screw inserted through the hole 612 from below is fixed to the fixing section 952 of the lens barrel 95.

The hook-shaped section 613, which serves as a positioner, is so provided on the upper surface 61A as to protrude therefrom. The hook-shaped section 613 locks onto the engaging section 326 of the frame body 3.

The opening 62 is located on the front side relative to the fixing section 61. Through the opening 62 are inserted the signal line connected to the control section 96 disposed below the fixing section 61 and a flexible printed board FPC (FIG. 20) including a signal line extending from the imaging device 8.

The opening 63 is located on the rear side relative to the fixing section 61. Through the opening 63 is inserted a signal line (not shown) extending from the image formation device 92 integrated with the lens barrel 95 described above and connected to the control section 96.

The hook-shaped section 64 corresponds to the positioner according to an aspect of the invention and is located in a front-side end portion of the substrate holder 6R. The hook-shaped section 64 locks onto the engagement section 312 described above (FIGS. 11 and 12).

The threaded hole 65 is formed in a position close to the hook-shaped section 64. To the threaded hole 65 is fixed a screw inserted from below through a hole 76 (FIG. 18) of the lower case 7R and the hole 524 (FIG. 15) of the upper case 5R.

The recess 66 is formed in the lower surface of the portion where the threaded hole 65 is formed. The protrusion 523 (FIG. 15) of the upper case 5R is fit into the recess 66.

The protrusion 67 is located on the rear side of the substrate holder 6R and protrudes upward beyond the raised portion formed along the circumferential edge of the substrate holder 6R. The protrusion 67 comes into contact with the lower surface of the rib 322 described above (FIGS. 11 to 13) when the substrate holder 6R is combined with the side surface section 32R.

The hole 68 is formed in the protrusion 67. Through the hole 68 is inserted from below a screw inserted through the case fixing section 3221 described above (FIGS. 11 and 12) and fixed to the threaded hole 516 (FIG. 15) of the upper case 5R.

The lower end section 69 corresponds to a first rib according to an aspect of the invention. The lower end section 69 protrudes downward from a portion slightly inside the circumferential edge of the substrate holder 6R and surrounds the circumference of the control section 96 (circumference in ±X directions and ±Z directions) disposed below the fixing section 61 described above, as shown in FIG. 8. The lower end section 69 is located further below the lower surface 61B, on which the control section 96 is disposed, and a front end surface 69A of the lower end section 69 (downward facing surface of lower end section 69) comes into contact with an upper surface 72A of an inner stepped section 72 (FIG. 18) of the lower case 7R. The inner stepped section 72 will be described later.

Configuration of Lower Case

Figure 18:
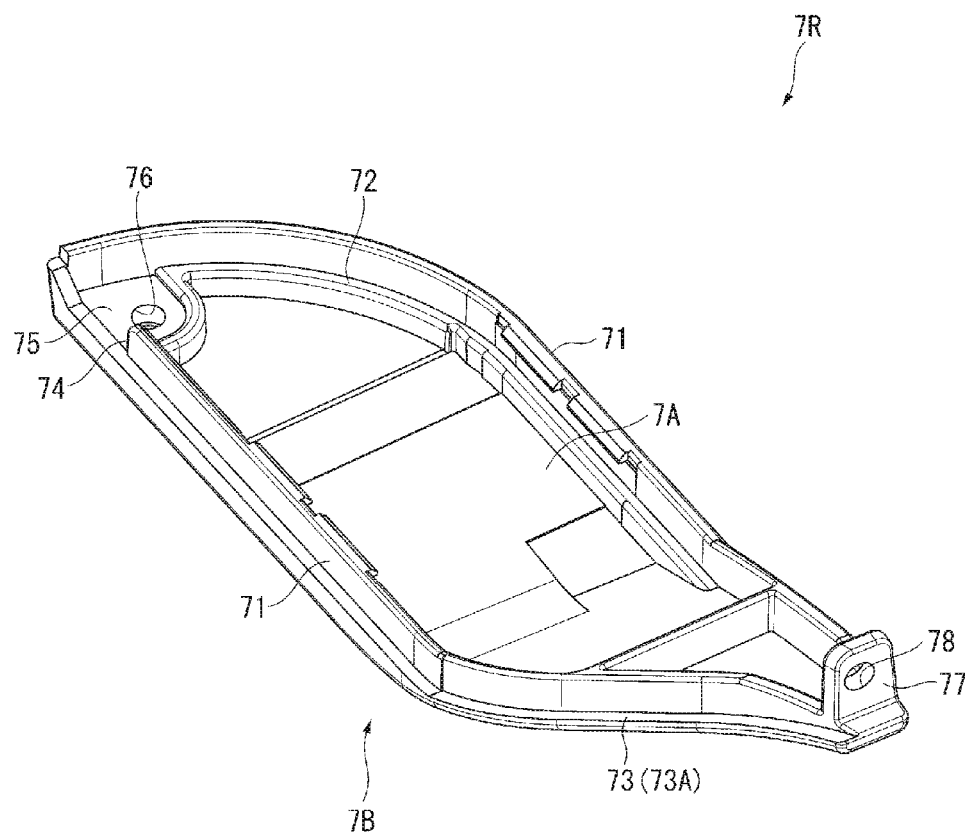
FIG. 18 is a perspective view showing a lower case in the embodiment.
Figure 19:
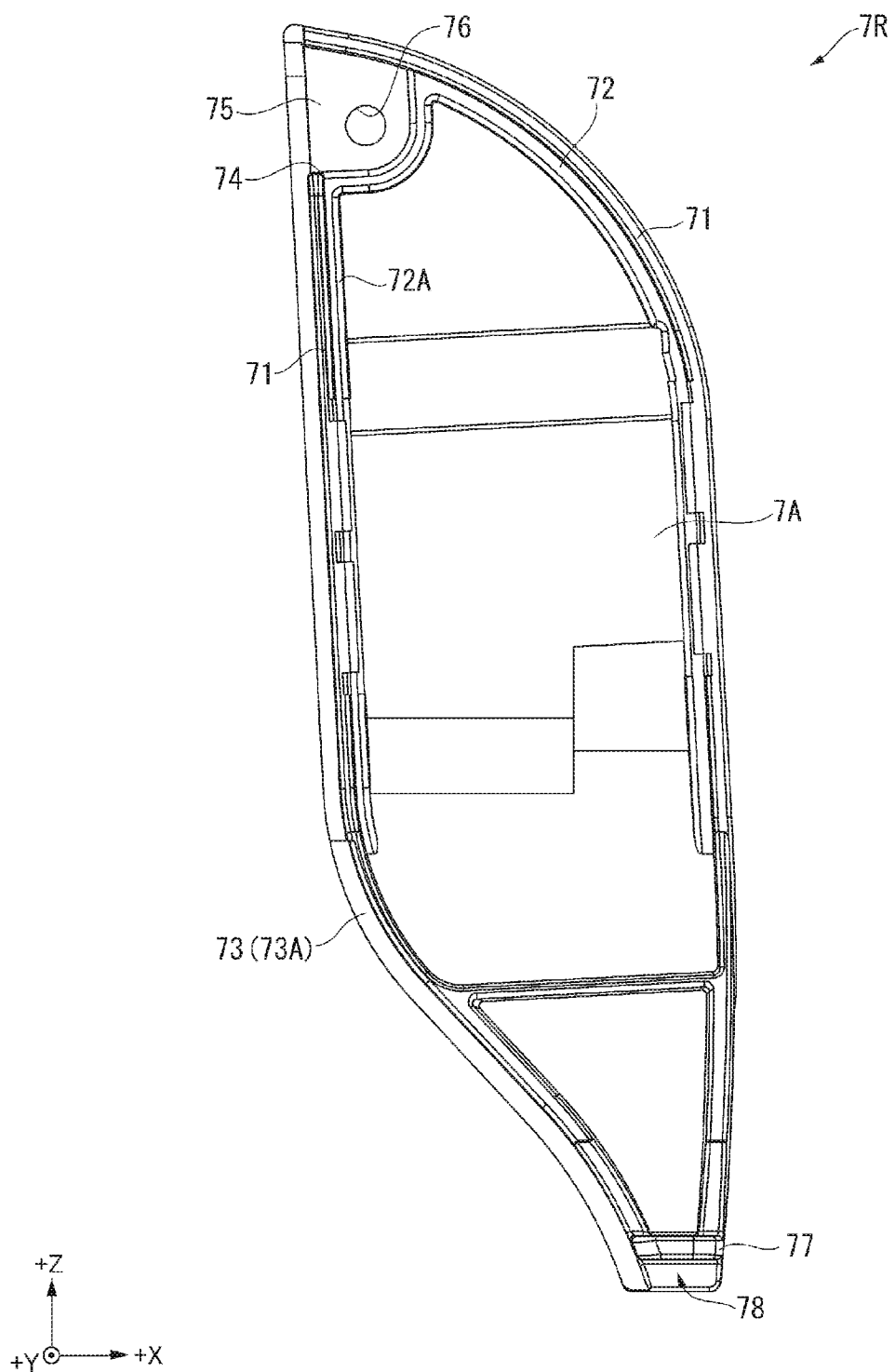
FIG. 19 is a perspective view showing the lower case in the embodiment.

FIG. 18 is a perspective view of the lower case 7R viewed from the rear side and from above, and FIG. 19 is a plan view of the lower case 7R viewed from above.

The lower case 7R is a member that covers the substrate holder 6R from below and is combined with the upper case 5R and the side surface section 32R to form the exterior of the accommodation section HPR.

The lower case 7R has an outer shape similar to that of the substrate holder 6R and is so shaped that the right end edge of the lower case 7R extends along the side surface section 32R and the left and rear end edges of the lower case 7R extend along the left and rear end edges of the upper case 5R, as shown in FIGS. 18 and 19. In addition to the above, a rear-side end portion of the lower case 7R inclines upward.

The thus configured lower case 7R has a raised section 71, the inner stepped section 72, the outer stepped section 73, a cutout 74, a flat section 75, the hole 76, a raised section 77, and the hole 78.

The raised section 71 is raised upward from the circumferential edge of a bottom surface 7A (surface facing substrate holder 6R) of the lower case 7R. The raised section 71 is so formed that the shape of the outer edge thereof roughly conforms to the shape of the outer edge of the substrate holder 6R viewed from above. When the lower case 7R engages with the side surface section 32R, the outer side surface of the right-side (+X-direction-side) raised section 71 of the lower case 7R comes into contact with a lower end portion of the inner surface 32A of the side surface section 32R.

The inner stepped section 72 is so formed inside the raised section 71 that the upper surface 72A is located below the upper end of the raised section 71 but above the bottom surface 7A (surface facing upward) of the lower case 7R. The front end surface 69A of the lower end section 69 (FIGS. 16 and 17) of the substrate holder 6R comes into contact with the upper surface 72A (contact surface), whereby a placement space in which the control section 96 described above is placed is formed between the lower surface 61B of the fixing section 61 of the substrate holder 6R and the bottom surface 7A of the lower case 7R. That is, the lower end section 69 of the substrate holder 6R is accommodated inside the raised section 71, whereby not only is the circumference of the control section 96 surrounded by the raised section 71 but also the control section 96 is covered with the fixing section 61 (FIGS. 16 and 17) from above and covered with the bottom surface 7A from below.

The outer stepped section 73 is so formed outside the left raised section 71 of the lower case 7R that the upper surface 73A is below the upper end of the raised section 71 but above a lower surface 7B (surface facing downward) of the lower case 7R. The lower end section 525 (FIG. 15) of the side surface section 52 of the upper case 5R comes into contact with the upper surface 73A. As a result, the joint between the lower case 7R and the upper case 5R can be less visible, and formation of a gap between these components can be avoided.

The cutout 74 is formed in a front-side end portion of the lower case 7R by cutting part of the raised section 71.

The flat section 75 is located inside the lower case 7R corresponding to the cutout 74. The protrusion 523 (FIG. 15) of the upper case 5R is inserted through the cutout 74 and disposed in the space between the flat section 75 and the recess 66 (FIG. 17) of the substrate holder 6R.

The hole 76 is formed in the flat section 75, and a screw inserted from below through the hole 76 is inserted through the hole 524 formed in the protrusion 523 and fixed to the threaded hole 65 (FIG. 17) formed in the substrate holder 6R. As a result, the upper case 5R, the substrate holder 6R, and the lower case 7R are fixed on the front side.

The raised section 77 is raised upward from a rear-side end portion of the lower case 7R.

The hole 78 is formed in the raised section 77. Through the hole 78 is inserted a screw inserted through the hole 533 (FIG. 15) of the upper case 5R, and the screw is fixed to the case fixing section 3251 (FIGS. 11 to 14) located at the rib 325 described above.

Figure 20:
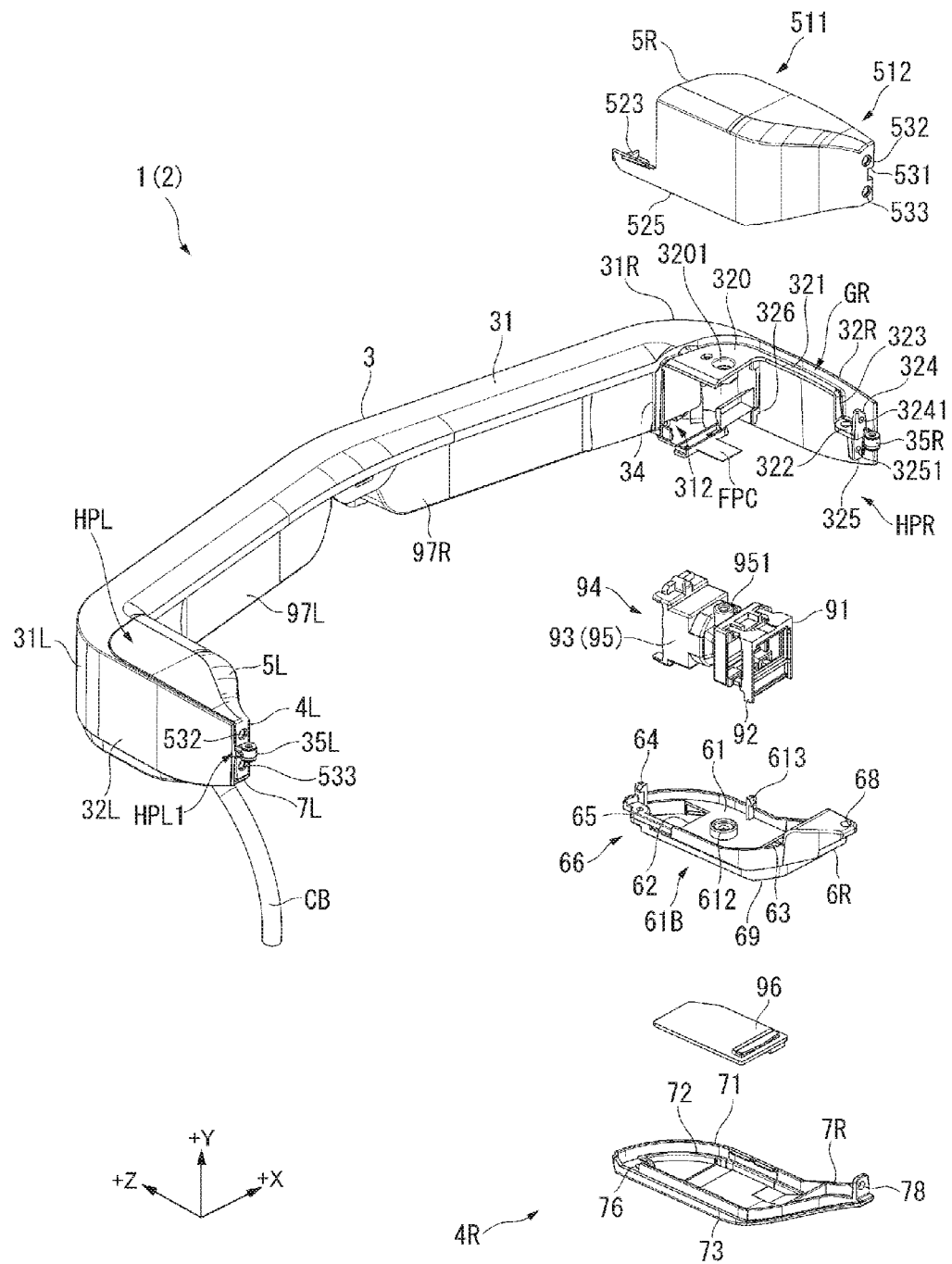
FIG. 20 describes the step of attaching an image projection section, a control section, and a case member to the frame body in the embodiment.

Attachment of Image Projection Section, Control Section, and Case Member to Frame Body FIG. 20 describes the step of attaching the image projection section 91 and the control section 96 in the optical device 9R and the case member 4R to the frame body 3.

To attach the image projection section 91 and the control section 96 in the optical device 9R and the case member 4R to the frame body 3 described above, a screw inserted from above through the hole 3201 of the fixing section 320 of the side surface section 32R is first fixed to the fixing section 951 of the lens barrel 95, as shown in FIG. 20. The image projection section 91 is thus fixed to the fixing section 320.

The substrate holder 6R is then fixed from below to the image projection section 91 (lens barrel 95). Specifically, the substrate holder 6R is attached to the frame body 3 in such a way that the hook-shaped sections 613 and 64, each of which serves as a positioner, lock onto the engaging sections 326 and 312 of the frame body 3. In this state, the upper end of the protrusion 67 comes into contact with the lower surface of the rib 322. In this state, a screw inserted from below into the hole 612 is fixed to the fixing section 952 of the lens barrel 95. As a result, the substrate holder 6R is fixed to the image projection section 91 in such a way that the image projection section 91 is covered from below, and the substrate holder 6R is temporarily fixed to (positioned relative to) the frame body 3.

The control section 96 is then disposed on the lower surface 61B of the fixing section 61 of the substrate holder 6R. At this point, the flexible printed board FPC inserted through the opening 62 is connected to the control section 96, and the signal line (not shown) from the image formation device 92 inserted through the opening 63 is connected to the control section 96.

Thereafter, the upper case 5R is so attached as to cover the image projection section 91 from above, and the lower case 7R is so attached as to cover the substrate holder 6R from below, followed by combination of the upper case 5R and the lower case 7R with each other and fixation of the combined cases to the side surface section 32R.

At this point, the upper case 5R is combined with the side surface section 32R from the user side in such a way that the protrusions 511 and 512 of the upper case 5R come into contact with the bottom of the groove GR formed in the fixing section 320 and the ribs 321 to 323 of the side surface section 32R. As a result, a base end portion (portion connected to rib 324) of the support section 35R is located in the recess 531, and the protrusion 523 is located in the recess 66 of the substrate holder 6R.

In this state, a screw is inserted from below through the hole 68 of the substrate holder 6R and the case fixing section 3221 (FIGS. 11 to 13), and the screw is fixed to the threaded hole 516 (FIG. 15) of the upper case 5R. As a result, the side surface section 32R is fixed to the upper case 5R and the substrate holder 6R on the rear side.

Further, a screw inserted into the hole 532 of the upper case 5R is fixed to the case fixing section 3241 of the rib 324, whereby the upper case 5R is fixed to the side surface section 32R.

On the other hand, the upper surface 72A of the inner stepped section 72 of the lower case 7R is caused to come into contact with the front end surface 69A of the lower end section 69 of the substrate holder 6R, and the lower end edge of the lower end section 525 of the upper case 5R is caused to come into contact with the upper surface 73A of the outer stepped section 73, whereby the lower case 7R is combined with the upper case 5R, the substrate holder 6R, and the side surface section 32R.

In this state, a screw is inserted from below into the hole 76 of the lower case 7R, and the screw is inserted through the hole 524 of the upper case 5R, followed by fixation of the screw to the threaded hole 65 of the substrate holder 6R, whereby the upper case 5R, the substrate holder 6R, and the lower case 7R are integrated with one another on the front side of the frame body 3.

Further, a screw is inserted into the hole 533 of the upper case 5R, and the screw is inserted through the hole 78 of the lower case 7R, followed by fixation of the screw to the case fixing section 3251 of the rib 325. As a result, the upper case 5R and the lower case 7R are fixed to the side surface section 32R on the rear side.

The step described above allows the image projection section 91 and the control section 96 in the optical device 9R and the case member 4R to be attached to the frame body 3.

The image projection section 91 and the control section 96 in the optical device 9L and the case member 4L can be attached to the frame body 3 by using the same step.

Drainage Structure of Accommodation Section

Figure 21:
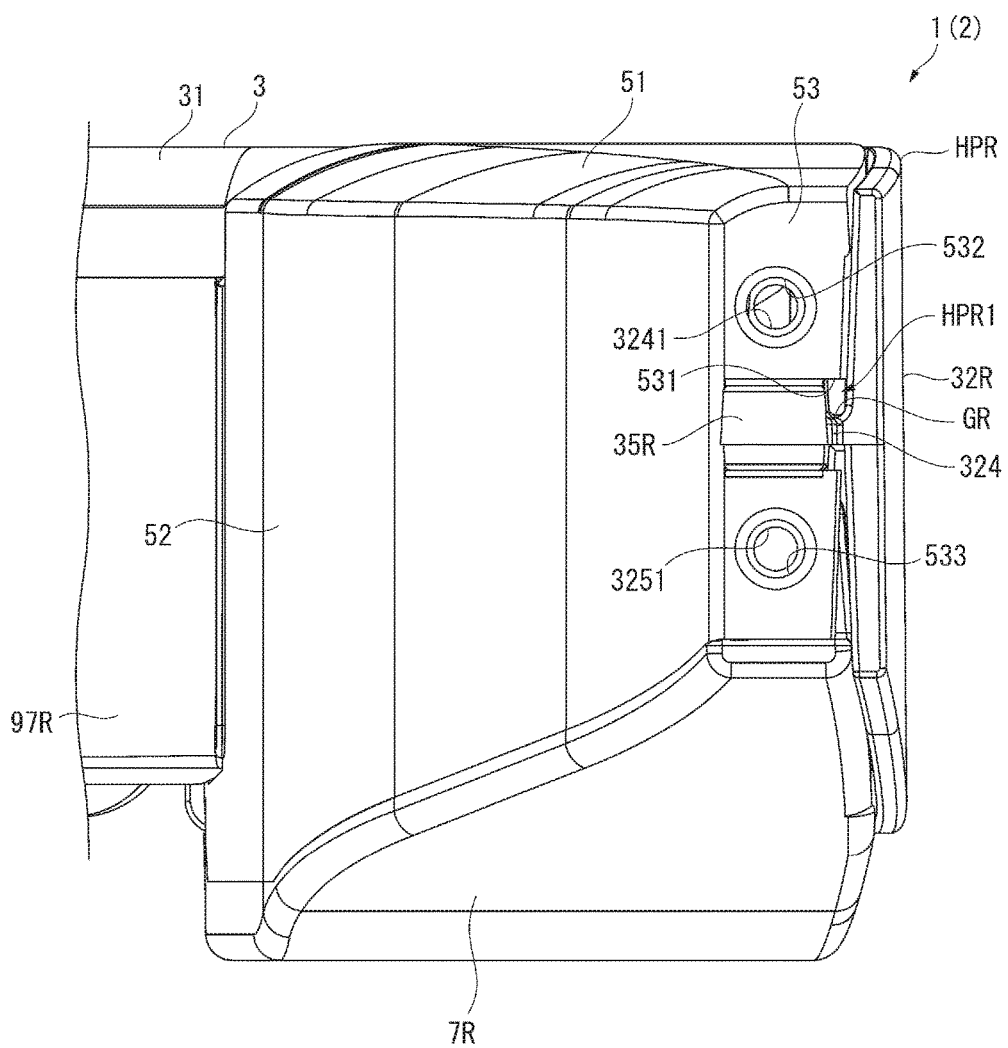
FIG. 21 shows a right accommodation section viewed from the rear side in the embodiment.

FIG. 21 shows the accommodation section HPR viewed from the rear side.

The fixing section 320 and the ribs 321 to 325 are formed on the inner surface 32A of the side surface section 32R, which is combined with the case member 4R to form the accommodation section HPR, as described above. The groove GR, into which the protrusions 511 and 512 of the upper case 5R, which forms the case member 4R, are inserted, is formed in the upper surfaces of the fixing section 320 and the ribs 321 to 324. That is, the groove GR along the extending direction of the side surface section 32R from the front section 31 (right end section 31R) is formed in the position of the joint between the side surface section 32R and the upper case 5R and over roughly the entire region of the joint in the extending direction of the side surface section 32R. The terminal end of the groove GR communicates with the space outside the accommodation section HPR through the opening HPR1 surrounded by the recess 531 of the upper case 5R and the side surface section 32R, as shown in FIG. 21.

Therefore, for example, in a case where liquid, such as rain and sweat, enters the accommodation section HPR through the joint described above, the liquid is guided along the groove GR to the rear side of the accommodation section HPR. The liquid is then discharged out of the accommodation section HPR through the opening HPR1.

The configuration described above prevents accumulation of the liquid having entered the accommodation section HPR through the joint described above in the accommodation section HPR and adherence of the liquid to the image projection section 91 and the control section 96.

The same holds true for the accommodation section HPL.

Structure for Protecting Image Projection Section and Control Section

Figure 22:
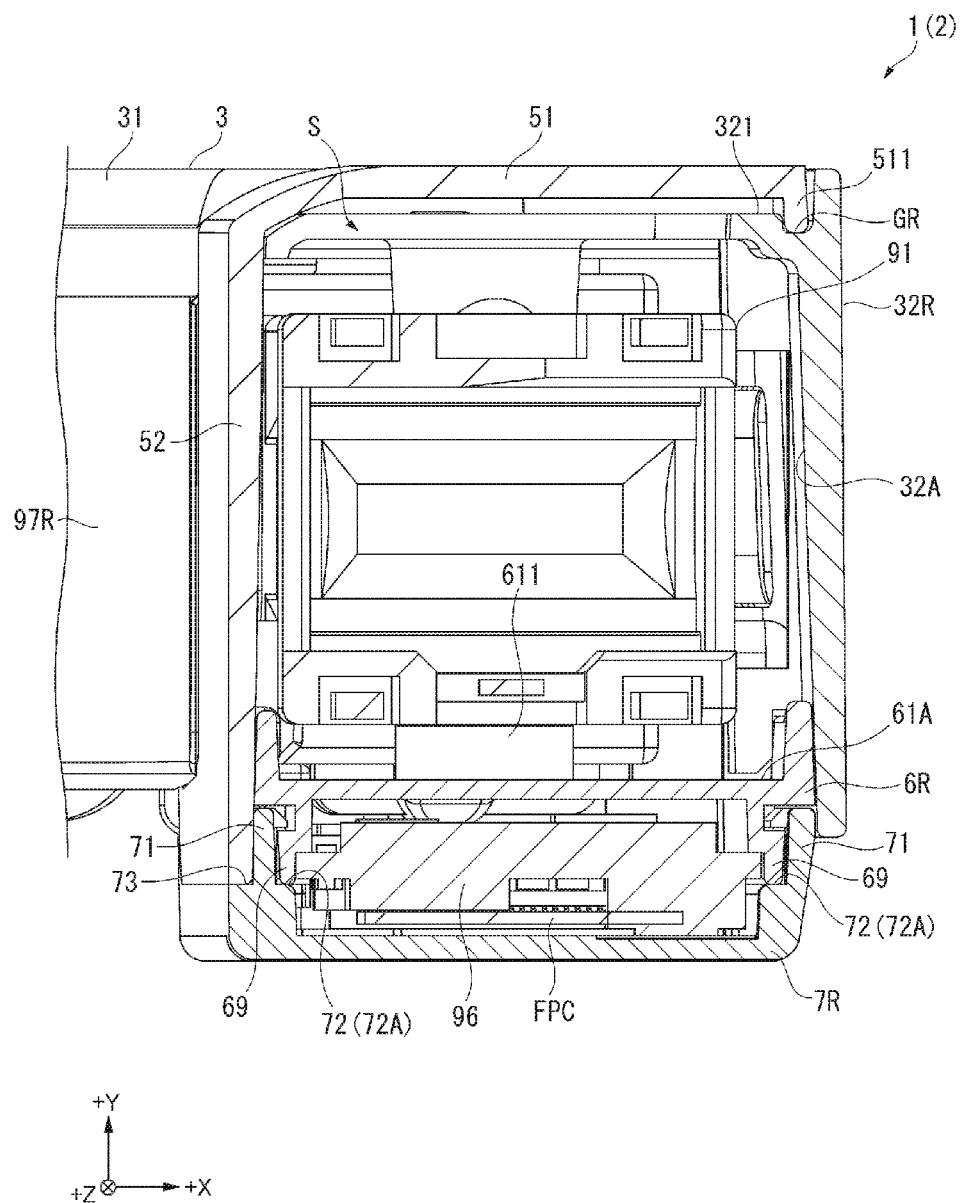
FIG. 22 is a cross-sectional view showing the right accommodation section in the embodiment.

FIG. 22 is a cross-sectional view of the accommodation section HPR taken along an XY plane passing through a roughly central point thereof in the +Z direction.

In the accommodation section HPR, the side surface section 32R and the case member 4R form a structure for protecting the image projection section 91 and a structure for protecting the control section 96.

Out of the two structures, the structure for protecting the image projection section 91 is formed of the side surface section 32R, which is located on the right of the image projection section 91, the front section 31, which is located in front of the image projection section 91, the upper case 5R, which is located above, on the left of, and behind (on the rear side of) the image projection section 91, and the substrate holder 6R and the lower case 7R, which are located below the image projection section 91, as shown in FIG. 22. The image projection section 91 is surrounded and protected by the components described above.

On the other hand, the structure for protecting the control section 96 is primarily formed of the side surface section 32R and the case member 4R. Specifically, the upper side and the rear side of the control section 96 are covered with the fixing section 61 and the lower end section 69 of the substrate holder 6R, and the lower side of the control section 96 is covered with the lowercase 7R, which has the inner stepped section 72, with which the lower end section 69 of the substrate holder 6R is in surface contact. Further, the upper case 5R covers the upper side of the substrate holder 6R and the lower case 7R and is in contact with the left side thereof, and the side surface section 32R is in contact with the right side of the substrate holder 6R and the lower case 7R and covers the rear side thereof. Moreover, the front section 31 covers the front side of the substrate holder 6R and the lower case 7R. As a result, the control section 96 is dually surrounded except the lower side and is therefore protected.

The same holds true for the accommodation section HPL.

Structure Around Light Guide Member

Figure 23:
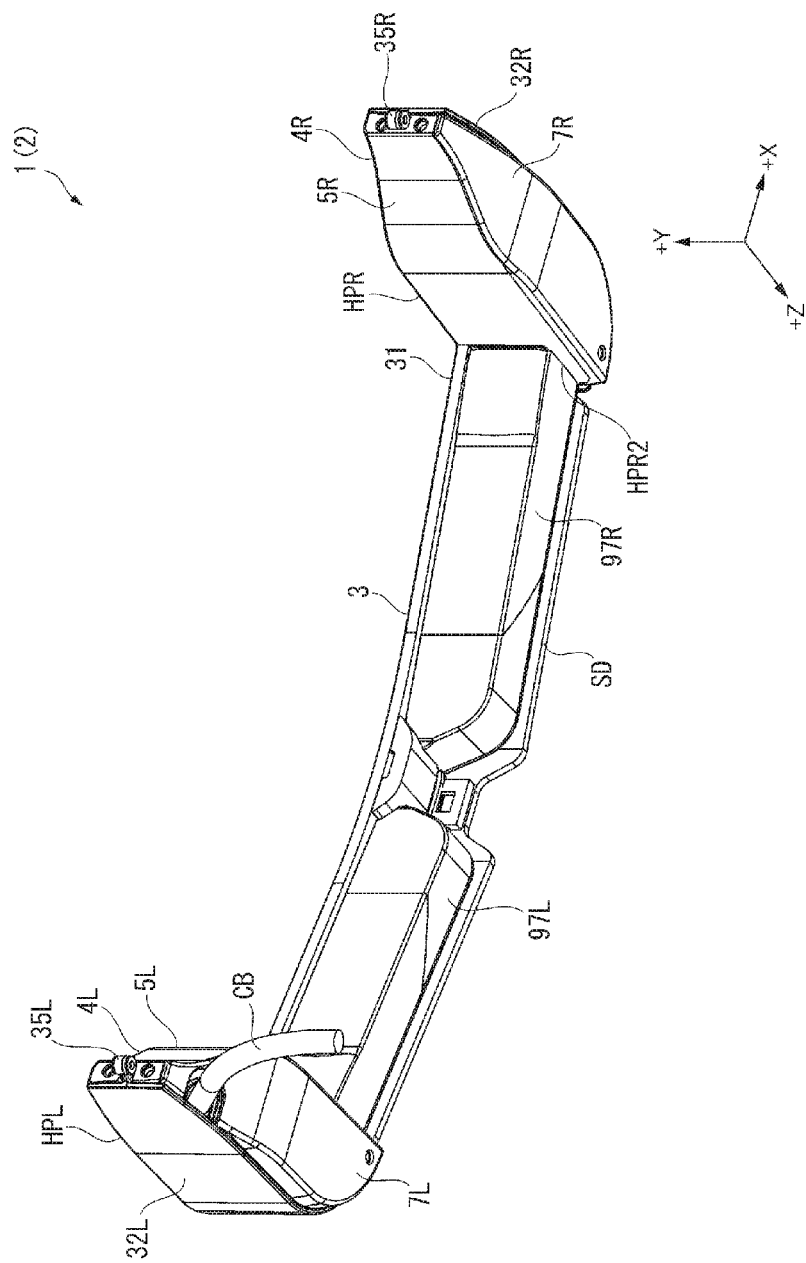
FIG. 23 is a perspective view of the HMD viewed from the rear side and from below in the embodiment.

FIG. 23 is a perspective view of the HMD 1 viewed from the rear side and from below. In other words, FIG. 23 shows the position of an insertion section HPR2 of the accommodation section HPR. In FIG. 23, the temples TMR and TML are omitted.

To cause the image light projected from the image projection section 91 disposed in the accommodation section HPR to enter the light guide member 97R described above, a right end portion of the light guide member 97R is disposed in the accommodation section HPR. Therefore, as shown in FIG. 23, when the upper case 5R is combined with the side surface section 32R, the front section 31 and a roughly L-letter-shaped portion formed on the front side of the upper case 5R form the insertion section HPR2, which is an opening through which the right end is inserted.

Figure 24:
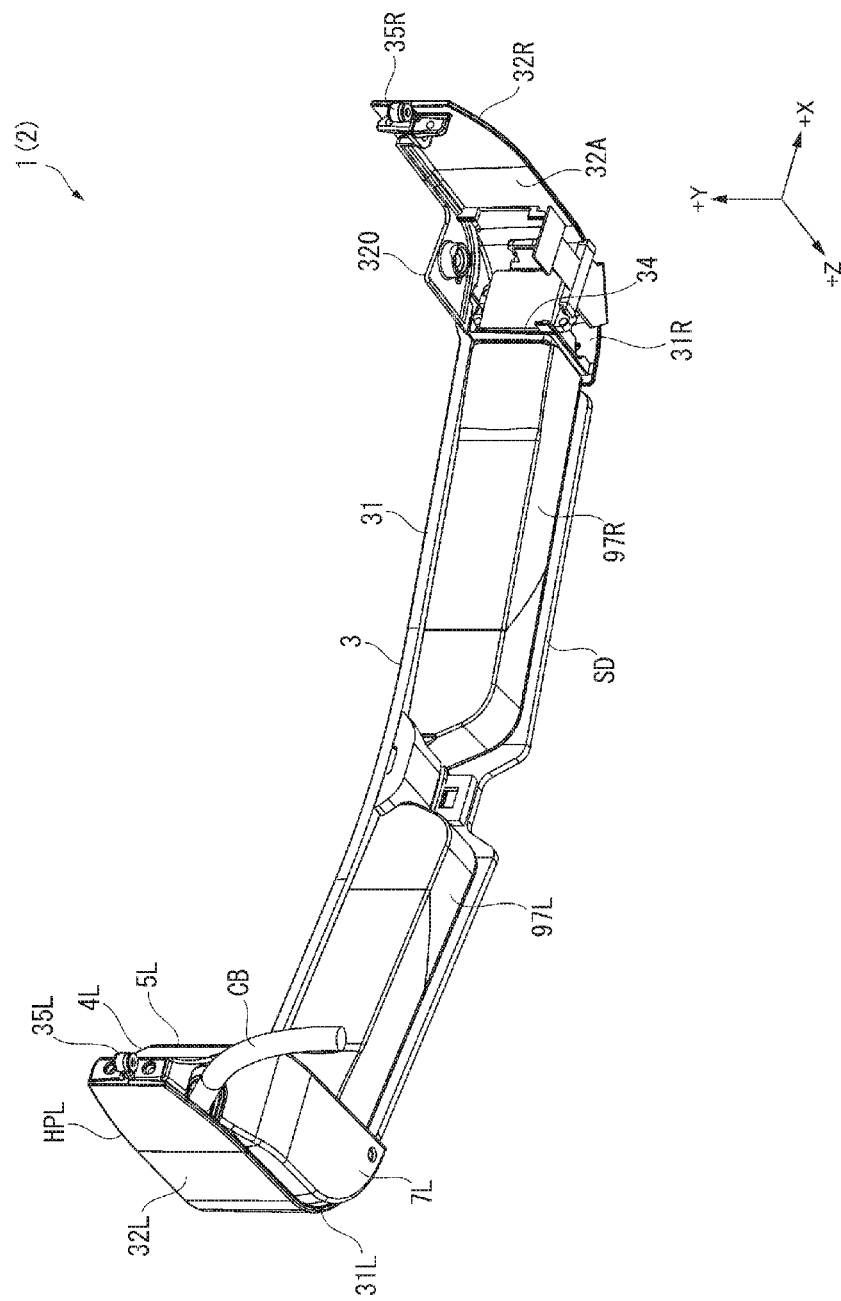
FIG. 24 is a perspective view showing a waterproof member provided in a light guide member in the embodiment.

FIG. 24 is a perspective view showing a waterproof member 34 provided around the right end portion of the light guide member 97R.

The waterproof member 34, which is provided around the right end portion of the light guide member 97R, is disposed in the insertion section HPR2, as shown in FIG. 24.

The waterproof member 34 is made of a material having elasticity, such as rubber and a cushion material having no water permeability, and formed in a frame-like shape that surrounds the end portion. The waterproof member 34 prevents a gap that allows the liquid described above to enter the accommodation section HPR from being formed between the end portion and the inner edge of the insertion section HPR2. The waterproof member 34 can therefore prevent entry of the liquid described above into the accommodation section HPR.

The accommodation section HPL also has an insertion section HPL2 having the same configuration, and a waterproof member 34 having a frame-like shape that surrounds a left end portion of the light guide member 97L is disposed in the accommodation section HPL, as shown in FIGS. 2 and 4.

Effects of Embodiment

The HMD 1 according to the present embodiment described above can provide the following effects.

Out of the image projection section 91 and the control section 96 accommodated in the case member 4R attached to the frame 2, the control section 96 is located below the image projection section 91. The circumference of the control section 96 is surrounded by the lower end section 69, which serves as the first rib and is part of the substrate holder 6R, which is located between the image projection section 91 and the control section 96, and the control section 96 is further covered with the upper case 5R and the lower case 7R.

The upper case 5R and the lower case 7R can therefore prevent entry of external liquid and adherence of the liquid to the image projection section 91 and the control section 96. Further, the upper side of the control section 96 is covered with the fixing section 61 of the substrate holder 6R, and the circumference of the control section 96 is surrounded by the lower end section 69 of the substrate holder 6R. Therefore, even if the liquid enters the case member 4R, adherence of the liquid to the control section 96 can be reliably avoided.

Therefore, since a gap that is likely to allow entry of liquid is not required to fill with a filler, such as an adhesive, a waterproof structure of the HMD 1 can be formed without complication of assembly work.

The accommodation section HPL and the optical device 9L, which have the same configurations as those of the accommodation section HPR and the optical device 9R, can also provide the same effect.

The image projection section 91 includes the image formation device 92, which forms an image, and the projection optical device 93, and the projection optical device 93 includes the lenses 94, which project the image formed by the image formation device 92, and the lens barrel 95, which accommodates the lenses 94. The image projection section 91 can therefore form an image according to supplied image information (image signal) and reliably project the image onto the light guide members 97R and 97L as the display section. The user can therefore visually recognize a desired image on the basis of external supply of the image information.

The frame body 3 includes the front section 31, which supports the light guide members 97R and 97L as the display section, and the side surface sections 32R and 32L, which extend from the front section 31 (right end section 31R and left end section 31L) toward the rear side and reside on the opposite sides of the user. Out of the two light guide members, the side surface section 32R has the ribs 321 to 325, which serve as the second rib and extend along the extending direction of the side surface section 32R from the front section 31, and the groove GR along the extending direction described above is formed in the upper surfaces of the ribs 321 to 324 and the fixing section 320. The upper case 5R, which is combined with the side surface section 32R, has the protrusions 511 and 512, which are inserted into the groove GR.

Therefore, in a case where liquid enters the gap between the side surface section 32R and the upper case 5R, the liquid can be guided along the groove GR toward the rib 324 (rear side). The liquid can therefore be moved away from the image projection section 91 and the control section 96. Adherence of the liquid to the image projection section 91 and the control section 96 can therefore be avoided, whereby the image projection section 91 and the control section 96 can be waterproofed.

The groove GR formed in the fixing section 320 and the ribs 321 to 324 of the side surface section 32L and the protrusions 511 and 512 of the upper case 5L, which are inserted into the groove GR and in contact with the bottom thereof, can also provide the same effect described above.

The groove GR is formed from the fixing section 320, which is located in an end portion that forms the side surface section 32R and faces the front side 31, to an end portion that forms the side surface section 32R and faces the side opposite the front section 31. The opening HPR1, which is formed when the upper case 5R is combined with the side surface section 32R, is located in the opposite end portion (rear-side end portion of accommodation section HPR). Therefore, liquid that enters the groove GR through the gap between the side surface section 32R and the upper case 5R can be guided along the groove GR toward the rear side, whereby the liquid can be discharged out of the accommodation section HPR through the opening HPR1. Adherence of the liquid to the image projection section 91 and the control section 96 can therefore be reliably avoided, whereby a waterproof structure of the HMD 1 can be reliably formed.

The accommodation section HPL, which has the same configuration as that of the accommodation section HPR, has an opening HPL1 (FIG. 20), which is the same as the opening HPR1, and can therefore provide the same effect described above.

The protrusions 511 and 512, which are in contact with the bottom of the groove GR, are part of the upper case 5R, and the upper case 5R, along with the lower case 7R, forms the outer case. The outer case having the protrusions 511 and 512 to be inserted into the groove GR described above can therefore be readily attached to the frame body 3, as compared with a case where an outer case formed of the upper case 5R and the lower case 7R integrated with each other is attached to the frame body 3.

The width dimension of the substrate holder 6R as an inner case is smaller than the width dimension of the upper case 5R. The upper case 5R can therefore reliably cover the substrate holder 6R from above. The substrate holder 6R can therefore be reliably protected from liquid, such as rain, coming from above the upper case 5R and impact applied therefrom, and the control section 96 can be in turn protected.

The accommodation section HPL, which is formed of the case member 4L and the side surface section 32L, can also provide the same effect described above.

The side surface section 32R has the engaging section 326, which is provided on the inner surface 32A and protrudes toward the substrate holder 6R, and the right end section 31R has the engaging section 312, which is provided on the inner surface of the right end section 31R and protrudes toward the substrate holder 6R. The substrate holder 6R has the hook-shaped sections 613 and 64, which serve as positioners and engage with the engaging sections 326 and 312. The substrate holder 6R can therefore be positioned relative to the frame body 3. The attachment of the upper case 5R and the lower case 7R, which are so attached as to cover the substrate holder 6R from above and below, can therefore be readily performed.

The side surface section 32L, the left end section 31L, and a substrate holder that forms the case member 4L can also provide the same effect described above.

Out of the upper case 5R and the lower case 7R, which form the outer case, the lower case 7R has the inner stepped section 72 having the upper surface 72A as the contact surface that comes into contact with the front end surface 69A of the lower end section 69 as the first rib. The inner stepped section 72 can prevent entry of liquid into the space which is formed by the lower end section 69 and the lower case 7R and in which the control section 96 is disposed. The control section 96 can therefore be waterproofed.

The case member 4L, which has the same configuration as that of the case member 4R, can also provide the same effect described above.

The lower case 7R has the raised section 71, which is raised along the circumferential edge of the bottom surface 7A as the facing surface, and the inner stepped section 72, which is located inside the raised section 71 and formed in a position below the front end surface of the raised section 71 but above the bottom surface 7A. The front end surface 69A of the lower end section 69 of the substrate holder 6R comes into contact with the upper surface 72A of the inner stepped section 72, and the outer side surface of the lower end section 69 comes into contact with the inner side surface of the raised section 71. The configuration described above can prevent entry of liquid through the gap between the lower end section 69, which is in contact with the inner stepped section 72, and the raised section 71 into the space in which the control section 96, the circumferential edge of which is surrounded by the lower end section 69, is disposed. Adherence of liquid to the control section 96 can therefore be more reliably avoided.

The lower case 7L, which has the same configuration as that of the lower case 7R, can also provide the same effect described above.

The lower case 7R has the raised section 71, which is raised along the circumferential edge of the bottom surface 7A, which faces the substrate holder 6R, and the outer stepped section 73, which is located outside the raised section 71 and is formed in a position below the front end surface of the raised section 71 but above the lower surface 7B of the lower case 7R. The lower end edge of the upper case 5R comes into contact with the outer stepped section 73. The configuration can prevent a gap that allows entry of liquid from being formed between the lower case 7R and the upper case 5R. Entry of liquid into the lower case 7R can therefore be avoided, whereby adherence of the liquid to the control section 96, the lower side of which is covered with the lower case 7R, can be reliably avoided.

The lower case 7L can also provide the same effect described above.

The insertion section HPR2, through which one end of the light guide member 97R as the display section is inserted, is formed when the frame body 3 is combined with the case member 4R. The waterproof member 34, which surrounds the right end portion of the light guide member 97R, is provided in the insertion section HPR2. The waterproof member 34 can prevent a gap that allows entry of liquid from being formed between the inner edge of the insertion section HPR2 and the light guide member 97R. Entry of liquid into the accommodation section HPR through the gap can therefore be avoided, whereby adherence of the liquid to the image projection section 91 and the control section 96 accommodated in the accommodation section HPR can be reliably avoided.

The accommodation section HPL can also provide the same effect described above.

Variations of Embodiment

The invention is not limited to the embodiment described above, and changes, improvements, and other modifications to the extent that the advantage of the invention is achieved fall within the scope of the invention.

The HMD 1 described above has the drainage structure described above and the protection structure described above, but not necessarily, and the HMD may have only one of the structures. That is, since provision of the drainage structure described above can prevent liquid from entering the accommodation sections, each of which accommodates the image projection section 91 and the control section 96, the image projection section 91 and the control section 96 can be protected from liquid even if the protection structure described above is omitted. Instead, since provision of the protection structure described above can prevent liquid from entering the space in which the control section 96 is disposed, the configuration in the space can be protected from liquid even if the drainage structure described above is omitted.

The fixing section 320 and the ribs 321 to 325 described above are formed over roughly the entire region from the front side of the side surface section 32R to the rear side thereof, and the groove GR is formed in the fixing section 320 and the ribs 321 to 324, but not necessarily. For example, the ribs and the groove may be divided as long as the liquid conveyed along the groove can be discharged out of the accommodation sections. Further, each of the ribs may extend linearly or arcuately and may incline upward or downward with respect to the extending direction described above. The configuration described above allows the liquid to be readily flow along the inclining groove, whereby the liquid can be readily discharged out of the HMD when the HMD is in normal use. The same holds true for the side surface section 32L.

The protrusions 511 and 512 of the upper case 5R are in contact with the bottom of the groove GR, but not necessarily, and the protrusions 511 and 512 may be omitted or may not be in contact with the bottom of the groove GR as long as an end section of the upper case 5R is in contact with the side surface section 32R above the groove GR. The state in which the protrusions 511 and 512 are inserted into the groove GR, however allows liquid having passed through the gap between the upper case 5R and the side surface section 32R to be readily guided to the groove GR. The same holds true for the side surface section 32L and the upper case 5L.

In the HMD 1 described above, the opening HPR1, which forms the terminal end of the liquid channel in the drainage structure described above is located on the rear side of the accommodation section HPR, but not necessarily. For example, the opening HPR1 may be located in the surface of the accommodation section HPR on the side opposite the user side or in the lower or front surface of the accommodation section HPR. That is, the opening HPR1 can be located in an arbitrary position. The same holds true for the accommodation section HPL.

In the HMD 1 described above, the case member 4R, which is combined with the frame body 3 to form the accommodation section HPR, has the substrate holder 6R as the inner case, and the upper case 5R and the lower case 7R, which form the outer case, but not necessarily, and the outer case may be a unitary case. Further, the configuration of each of the members described above is not limited to the configuration described above and can be changed as appropriate. The same holds true for the case member 4L.

In the HMD 1 described above, the width dimension of the substrate holder 6R is smaller than the width dimension of the upper case 5R, but not necessarily. In a case where the lower case 7R combined with the upper case 5R covers a side (left side) of the substrate holder 6R, the width dimension of the substrate holder 6R may be greater than the width dimension of the upper case 5R. That is, in a case where the width dimension of the substrate holder 6R is smaller than the width dimension of the outer case, the same effect described above can be provided. The same holds true for the case member 4L.

In the HMD 1 described above, the protrusions 326 and 312, onto which the hook-shaped sections 613 and 64 of the substrate holder 6R as the inner case lock as positioners, are so provided on the inner surface 32A of the side surface section 32R as to protrude from the inner surface 32A, but not necessarily. The number of protrusions and positioners can be changed as appropriate, and the inner case does not necessarily engage with the side surface section as long as the inner case can be held in the outer case. That is, the protrusions and the positioners may be omitted. The same holds true for the side surface section 32L and the case member 4L.

In the HMD 1 described above, the lower case 7R has the inner stepped section 72 located inside the raised section 71 and having the upper surface 72A, with which the front end surface 69A of the lower end section 69 of the substrate holder 6R comes into contact, but not necessarily, and the front end surface 69A may be configured to directly come into contact with the bottom surface 7A.

The lower case 7R further has the outer stepped section 73 having the upper surface 73A, with which the lower end portion of the side surface section 52 of the upper case 5R, but not necessarily, and the outer stepped section 73 may be omitted in a case where the side surface section 52 covers a side (left side) of the lower case 7R.

The same holds true for the case member 4L having the lower case 7L.

The HMD 1 described above includes the waterproof member 34, which is disposed in the insertion section HPR2 and surrounds the light guide member 97R, but not necessarily. The waterproof member 34 may be omitted or may not have the frame-like shape that surrounds the light guide member 97R as long as entry of liquid through the gap between the insertion section HPR2 and the light guide member 97R can be avoided. Further, the waterproof member 34 may be omitted in a case where the end portion of the light guide member 97R is not located in the accommodation section HPR, and the waterproof member 34 may not be necessarily provided in a case where a differently configured display section is employed as the display section. The same holds true for the waterproof member 34 that surrounds the light guide member 97L.

In the HMD 1 described above, the lower case 7R has the cutout 74, which allows the protrusion 523 of the upper case 5R to be located on the flat section 75, but not necessarily, and the raised section 71 may be a complete-circuit (roughly complete-circuit) section with no cutout 74 along the circumferential edge of the lower case 7R. In this case, the inner stepped section 72 may similarly be a complete-circuit (roughly complete-circuit) section along the circumferential edge of the lower case 7R. The configuration described above can more reliably prevent entry of liquid through the side surface of the outer case formed of the upper case 5R and the lower case 7R. The outer case may further be provided with a drain port through which liquid having entered the outer case is discharged, or a liquid discharge wall or a waterproof wall may further be provided in the outer case. Moreover, the configuration in which the upper case 5R is in contact with the outer stepped section 73 of the lower case 7R may be replaced with a configuration in which the upper case 5R covers the lower case 7R from above and liquid having entered the outer case is discharged through the gap between the inner surface (inner surface 52A, for example) of the upper case 5R and the outer surface of the lower case 7R. The same holds true for the case member 4L.

In the HMD 1 described above, the light guide members 97R and 97L, which guide the image light projected from the image projection sections 91 accommodated in the accommodation sections HPR and HPL to the user's eyes, are employed as the display section, but not necessarily, and the display section may be a display panel, such as a liquid crystal panel and an organic EL panel. That is, the invention is also applicable to a closed-type HMD, and as long as an image can be so displayed as to be visually recognizable by the user, the display scheme of the image may be arbitrarily determined. Further, in place of the light guide members 97R and 97L, reflection members that reflect images projected by the image projection sections 91 toward the user's eyes may be employed as the display section.

The members accommodated in each of the accommodation sections HPR and HPL do not necessarily include both the image projection section 91 and the control section 96 and may include only one of the image projection section 91 and the control section 96. The members may further include a control circuit, a power supply, and other members necessary for the action of the display section.

Further, in the HMD 1, the optical devices 9R and 9L, which include the light guide members 97R and 97L arranged in accordance with the user's eyes, are provided in correspondence with the user's right and left eyes, but not necessarily, and an HMD provided with only one of the optical devices 9R and 9L may be configured.

In the HMD 1 described above, one imaging device 8 is provided in the right end section 31R of the frame body 3, but not necessarily, and the position of the imaging device 8 and the number of imaging devices 8 can be changed as appropriate. For example, the imaging device 8 may be provided in the left end section 31L or may be provided in each of the left end section 31L and the right end section 31R. Further, no imaging device may be provided in the right end section 31R or the left end section 31L, but at least one imaging device may be provided, for example, at the center of the frame body 3, in the side surface section 32R or 32L, or the case member 4R or 4L.

In the HMD 1 described above, the control section 96, which is provided in each of the optical devices 9R and 9L, controls the action of the image projection section 91, that is, image formation performed by the image formation device 92, but not necessarily. For example, the control section 96 provided in the optical device 9R described above may control the action of the imaging device 8 (including light-up action of light emitting section) or may control charge of a battery held by the frame 2 by using externally supplied electric power. The control section 96 may further control communication with an image display apparatus of another HMD 1 or any other apparatus or with an image supply apparatus or any other electronic apparatus. That is, the process carried out by the control section 96 accommodated in each of the accommodation sections HPR and HPL may be other processes. In this case, a control device that controls the action of the image formation device 92 may be provided at a separate location.

Further, the control section 96 is not limited to a printed board and may be a flexible printed board or may be a control unit having a computation processing circuit or any other circuit element. That is, the control section according to an aspect of the invention may be arbitrarily configured as long as the control section performs predetermined control.

The above embodiment has been described with reference to the case where the accommodation sections HPR and HPL, which are configured in the form of the combination of the frame body 3 and the case members 4R and 4L and each accommodate the control section 96, are provided in the HMD 1, which is a head mounted image display apparatus, but not necessarily. For example, the configuration according to the embodiment of the invention may be applicable to another electronic apparatus (camera, for example) in which the imaging device 8 described above is supported by the frame body 3. That is, at least part of the configuration described above may be applied to an electronic apparatus mounted on the user's head for use.

The entire disclosure of Japanese Patent Application No. 2016-026432, filed Feb. 15, 2016 is expressly incorporated by reference herein.

What is claimed is:

1. A head mounted image display apparatus comprising:
   an optical projection device that forms an image and projects the image;
   a display that displays the image projected by the optical projection device;
   a controller that controls the image formation performed by the optical projection device;
   a frame that supports the display; and
   a case that is attached to the frame and accommodates the optical projection device and the controller,
   wherein the controller is located below the optical projection device when the head mounted image display apparatus is worn by a user, and
   the case includes
      an inner case that has a first rib surrounding a circumference of the controller and is located between the optical projection device and the controller, and
      an outer case that is attached to the frame and covers the optical projection device and the controller and further covers the inner case.

2. The head mounted image display apparatus according to claim 1,
   wherein the optical projection device includes
      a display panel that forms the image,
      a lens that projects the image formed by the display panel, and
      a lens barrel that accommodates the lens.

3. The head mounted image display apparatus according to claim 1,
   wherein the frame has
      a front section that supports the display, and
      a side surface section that extends from an end portion of the front section in a direction intersects the front section,
   the side surface section has a fixing section that extends from an end portion of the front section in a width direction perpendicular to an extending direction and further perpendicular to an upward/downward direction, a first groove formed in an upper surface of a second rib and extending along the extending direction, the fixing section has a second groove formed in the upper surface of the fixing section and extending along the width direction, and the outer case has a protrusion inserted into the first groove and the second groove.

4. The head mounted image display apparatus according to claim 3, wherein the first groove is formed from a predetermined position in the side surface section to an end portion that forms the side surface section and is located on a side opposite the front section, and at least one of the outer case and the side surface section has an opening that exposes the first groove on the side opposite the front section.

5. The head mounted image display apparatus according to claim 3, wherein the outer case has an upper case that covers the optical projection device and the inner case from above, and a lower case that covers the inner case and the controller from below, and the upper case has the protrusion.

6. The head mounted image display apparatus according to claim 5, wherein a dimension of the inner case in a width direction perpendicular to the extending direction and further perpendicular to an upward/downward direction is smaller than a dimension of the upper case in the width direction.

7. The head mounted image display apparatus according to claim 3, wherein the side surface section has an engaging section that protrudes toward the inner case, and the inner case has a positioner that engages with the engaging section to position the inner case relative to the side surface section.

8. The head mounted image display apparatus according to claim 1, wherein the outer case has an upper case that covers the optical projection device and the inner case from above, and a lower case that covers the inner case and the controller from below, and the lower case has a contact surface that comes into contact with a front end surface of the first rib.

9. The head mounted image display apparatus according to claim 8, wherein the lower case has a raised section that is raised along a circumferential edge of a facing surface that faces the inner case, and an inner stepped section that is located inside the raised section and so formed as to be lower than a front end surface of the raised section but above the facing surface, the inner stepped section has the contact surface, and a side surface of the first rib comes into contact with a side surface of the raised section.

10. The head mounted image display apparatus according to claim 8, wherein the lower case has a raised section that is raised along a circumferential edge of a facing surface that faces the inner case, and an outer stepped section that is located outside the raised section and so formed as to be lower than a front end surface of the raised section but above a lower surface of the lower case, and a lower end edge of the upper case comes into contact with the outer stepped section.

11. The head mounted image display apparatus according to claim 1, wherein the frame and the case have an insertion section through which one end of the display is inserted, and a waterproof member that surrounds the one end of the display and connects the display to the insertion section is provided in the insertion section.

* * * * *